United States Patent
Siri

(10) Patent No.: US 11,056,881 B2
(45) Date of Patent: Jul. 6, 2021

(54) MAXIMUM POWER TRACKING AMONG DIFFERENT GROUPS OF DISTRIBUTED POWER SOURCES WITH UNIFORM TIME/VOLTAGE DISTRIBUTION CONTROL

(71) Applicant: The Aerospace Corporation, El Segundo, CA (US)

(72) Inventor: Kasemsan Siri, Torrance, CA (US)

(73) Assignee: The Aerospace Corporation, El Segundo, CA (US)

( * ) Notice: Subject to any disclaimer, the term of this patent is extended or adjusted under 35 U.S.C. 154(b) by 59 days.

(21) Appl. No.: 16/430,384

(22) Filed: Jun. 3, 2019

(65) Prior Publication Data

US 2020/0381918 A1    Dec. 3, 2020

(51) Int. Cl.
| | | |
|---|---|---|
| H02J 3/38 | (2006.01) | |
| H02M 3/335 | (2006.01) | |
| H02M 7/5387 | (2007.01) | |
| H02J 1/10 | (2006.01) | |
| H02J 7/00 | (2006.01) | |

(52) U.S. Cl.
CPC .............. *H02J 1/102* (2013.01); *H02J 7/007* (2013.01)

(58) Field of Classification Search
CPC .............. H02J 2300/20; H02J 2300/22; H02J 2300/24; H02J 2300/26; H02J 2300/28
See application file for complete search history.

(56) References Cited

U.S. PATENT DOCUMENTS

| | | | |
|---|---|---|---|
| 6,009,000 A | 12/1999 | Siri | |
| 2008/0150366 A1* | 6/2008 | Adest | H02J 3/14 307/77 |
| 2012/0068547 A1* | 3/2012 | Vermeersch | G05F 1/67 307/82 |

OTHER PUBLICATIONS

Kasemsan Siri and Kenneth A. Conner, "Fault-Tolerant Scaleable Solar Power Bus Architectures with Maximum Power Tracking," APEC2001, Mar. 4-8, 2001, pp. 1009-1014.
Kasemsan Siri and Kenneth A. Conner, "Independently-Sourced Parallel-Connected Power Systems with Maximum Power Tracking," APEC2003, Feb. 9-13, 2003, pp. 533-539.
Kasemsan Siri and Kenneth A. Conner, "Parallel Connected Converters with Maximum Power Tracking," APEC2002, Mar. 9-14, 2002.
Kasemsan Siri and Michael Willhoff, "Current-Sharing/Voltage-Distribution Control for Interconnected DC-DC Converters," 2007 International Energy Conversion Engineering Conference and Exhibit, Jun. 2007, St. Louis, MO.

(Continued)

*Primary Examiner* — Rexford N Barnie
*Assistant Examiner* — Elim Ortiz
(74) *Attorney, Agent, or Firm* — LeonardPatel PC

(57) ABSTRACT

An apparatus may include a group of distributed-input series-output (DISO) converters, each of which are actively controlled by a common maximum power tracking (MPT) controller. The common MPT controller is configured to actively control one of the DISO converters in the group of DISO converters to update a present group-peak power voltage of the one DISO converters while remaining DISO converters in the group of DISO converters are controlled to hold most recently grouped peak power voltages updated during their previously non-overlapping uniform time windows of active MPT control.

10 Claims, 25 Drawing Sheets

(56) References Cited

OTHER PUBLICATIONS

Kasemsan Siri and Michael Willhoff, "Optimum Energy Harvesting among Distributed Power Sources with Uniform Voltage Distribution," IEEE Aerospace Proceedings CD ROM, Session 7.08 Power Electronics for Space Applications, paper #1718, Mar. 2012.

Kasemsan Siri and Michael Willhoff, "Optimum Power Tracking among Series-Connected Power Sources with Uniform Voltage Distribution," IEEE Aerospace Proceedings CD ROM, Session 7.0701 Power Electronics for Space Applications, paper #1023, Mar. 2011.

Kasemsan Siri, Calvin Truong, and Kenneth A. Conner, "Uniform Voltage Distribution Control for Paralleled-Input, Series-Output Connected Converters", IEEE Aerospace Conference Proceedings, vol. 2, Track 8 Mar. 2005.

Kasemsan Siri, Majd Batarseh, Frank Chen, "Unified Maximum Power Tracking among Distributed Power Sources," APEC2014, Mar. 16-20, 2014, pp. 2985-2992.

Kasemsan Siri, Michael Willhoff, and Kenneth A. Conner, "Uniform Voltage Distribution Control for Series-Input, Parallel-Output Connected Converters," IEEE Aerospace Conference Proceedings, vol. 2, Track 8 Mar. 2006.

Kasemsan Siri, Michael Willhoff, and Kenneth Conner, "Uniform Voltage Distribution Control for Series Connected DC-DC Converters," IEEE Trans. Power Electronics, vol. 22, No. 4, Jul. 2007, pp. 1269-1279.

M. Jordan, "UC3907 Load Share IC Simplifies Parallel Power Supply Design," Unitrode Application Note U-129, pp. 9-296 to 9-305.

\* cited by examiner

MAXIMUM POWER TRACKING AMONG DIFFERENT GROUPS OF DISTRIBUTED POWER SOURCES WITH UNIFORM TIME/VOLTAGE DISTRIBUTION CONTROL

FIELD

The present invention relates to maximum power tracking, and more specifically, to maximum power tracking control that utilizes Uniform Time Division (UTD) among different groups of Distributed-Input Series-Output (DISO) converters.

BACKGROUND

Reliable and expandable architectures of power electronics and control approaches enable efficient power processing and transmission from distributed and unregulated power sources to a commonly usable and well-regulated voltage. Electrical power systems that adopt DISO converters are becoming a viable choice for achieving reliable power/voltage performance in aerospace and terrestrial renewable energy applications. DISO converters can be controlled to achieve optimum power throughput from non-identical power sources by using uniform input voltage distribution (UIVD) control.

FIG. 1 is a circuit diagram illustrating a conventional direct current (DC) to DC converter 100. In FIG. 1, DC-DC converter 100 includes an opto-isolated control input $V_{Cj}$ that is electrically isolated from DC-DC converter's 100 input power and return terminals. An output-isolated DC-DC converter 102 with an opto-coupler circuit 104 provides electrical isolation for controlling the converter power flow using the control input $V_{Cj}$. In this manner, many isolated-control converters have their input power ports individually connected to their respective power sources while the converters are independently controllable through their respective control inputs $V_{Cj}$ and their outputs $V_{Oj}$ are connected in series for power delivery to a shared load. In general, each converter's input-power return −IN, and the system controller's reference ground may not have the same operating voltage or are not the same electrical node. Therefore, isolated-control converters 102 with their respective opto-coupler circuits 104 provide flexibilities for interconnection among many converters such that their input power returns do not need to be tied together to the system controller's reference ground. Typically, an input-filter capacitor $C_{IN}$ of sufficient capacitance is terminated across each converter input to achieve an acceptable AC input-ripple voltage, particularly when the converter input voltage is controlled to meet certain control objectives.

Each isolated-control DC-DC converter 102 shown in FIG. 1 is a single-converter power stage or a group of multiple-converter power stages that are connected in parallel. The parallel-connected converter power stages of a current-mode type are preferred. The current-mode converter power stages allow for a common shared-bus voltage signal (at node SB) to command the converter power stages in unison to achieve uniform current-sharing and at the same time to serve other control objectives. Different approaches of shared-bus current-sharing were studied for parallel-connected converters of current-mode type and for those of non-current-mode type. According to studies, some current-sharing control schemes do not offer the commonly controllable current-sharing shared-bus since the parallel-connected converter power stages are not of the current-mode type, and its shared-bus can only be used for current-sharing purposes and cannot be controlled directly to serve other control objectives.

Thus, an alternative maximum power tracking system may be beneficial.

SUMMARY

Certain embodiments of the present invention may provide solutions to the problems and needs in the art that have not yet been fully identified, appreciated, or solved by current power tracking system. For example, some embodiments may pertain to a common maximum power tracking (MPT) controller combined with UTD and UIVD control developed for many clustered sets of DISO converters In one embodiment, an apparatus includes a group of DISO converters, each of which are actively controlled by a common MPT controller. The common MPT controller is configured to actively control one of the DISO converters in the group of DISO converters to update a present group-peak power voltage of the one DISO converters while remaining DISO converters in the group of DISO converters are controlled to hold most recently grouped peak power voltages updated during a previously uniform time window of an active MPT control.

In another embodiment, an apparatus includes a plurality of DISO converters actively controlled by a common MPT controller and a UTD controller. The common MPT controller is configured to actively enable one DISO converter from the plurality of DISO converters to update a new peak power voltage of the one DISO converter while the remaining DISO converters are controlled to hold most recent peak power voltages. The most recent peak power voltages is updated during a previous uniform time window of an active MPT control. The UTD controller is configured to enable an input voltage of the one DISO converter to be actively controlled to reach or approach a new peak power voltage of an associated power source connected to the one DISO converter while the remaining DISO converters are disabled from being actively controlled for their respective new peak power voltages and are further controlled to hold their most recently peak power voltages, the most recent peak power voltages being previously updated during the previous uniform time window of their active MPT control using the common MPT controller.

In yet another embodiment, an apparatus includes groups of DISO converters actively controlled by a common MPT controller, a UTD controller, and a group uniform voltage distribution (UVD) controller. The MPT controller actively controls the DISO converters in one enabled group of DISO converters to update a present group-peak power voltage of the DISO converters within the enabled group, while remaining converter groups are controlled to hold most recent grouped peak power voltages updated during their previous non-overlapping uniform time windows of active MPT control. The UTD controller enables input voltages of the one enabled group to be actively controlled to reach or approach a new group peak power voltage of associated power sources connected to the DISO converters within the enabled group, while the remaining converter groups are disabled from being actively controlled for their respective new group peak power voltages, and are controlled to hold most recent group peak power voltages, which are obtained during their previous non-overlapping time windows of active MPT control. The most recent group peak power voltages are previously updated during the previous uniform time windows of the active MPT control using the common MPT controller. Each UVD controller is dedicated per one group of DISO converters and is configured to actively equalize distributed input voltages of the DISO converters belonging to the associated converter group. It should be noted that equal input voltages for one group of DISO converters have a different voltage from that of the equal input voltages for another group of DISO converters, and the number of the group UVD controllers are equal to the number of groups of DISO converters.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Figure 1:
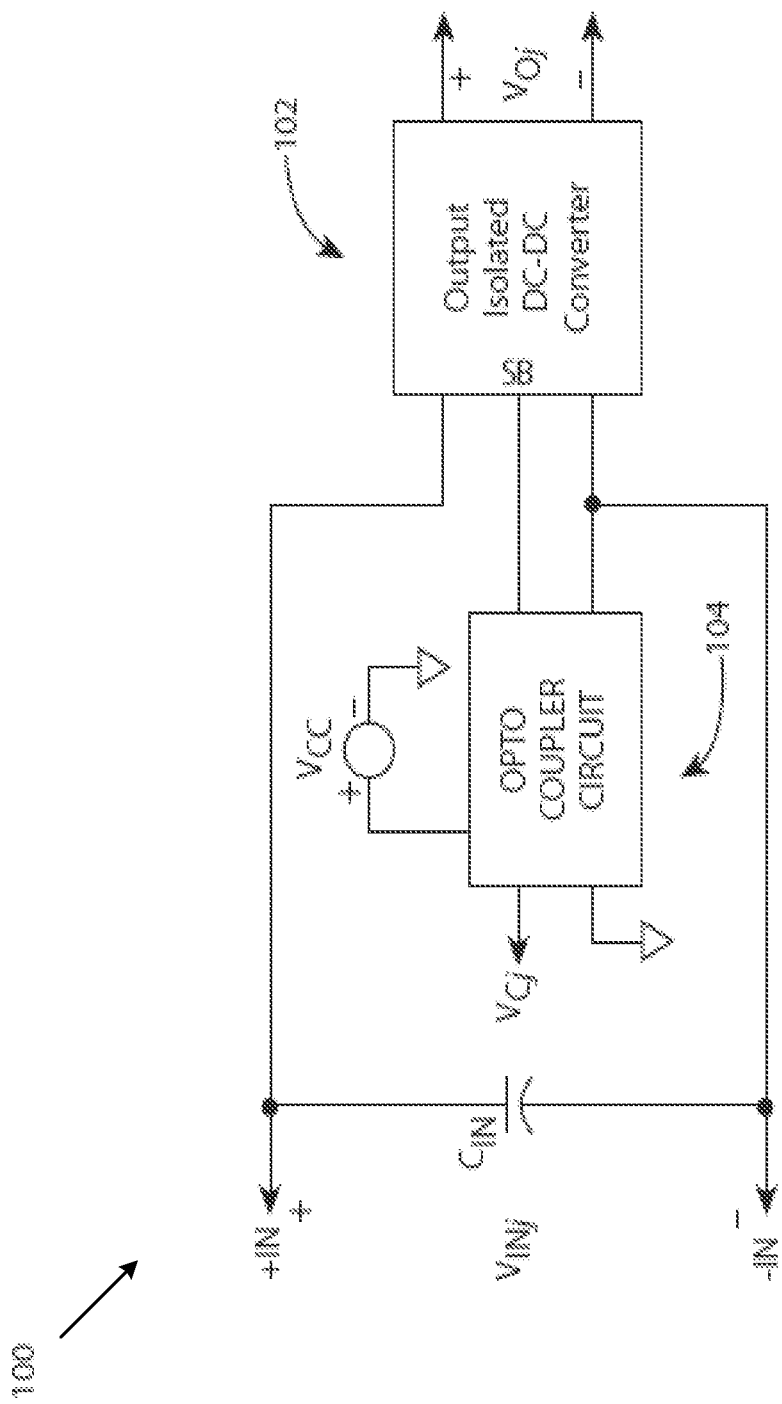
FIG. 1 is a circuit diagram illustrating a conventional direct current (DC) to DC converter.

Some embodiments of the present invention generally pertain to a single MPT controller combined with UTD and UIVD control developed for many clustered sets of DISO converters. These DISO converters simultaneously process distributed flows of electricity into a common bus voltage.

Through modeling and simulation, some embodiments described herein demonstrate that nearly full utilization of energy, which is delivered by clustering groups of the distributed power sources having non-identical peak power ratings, can be achieved through a unified integration of MPT, UIVD, and UTD control. Two power system architectures are described herein—a battery-dominated bus and a regulated-voltage bus. Because of UIVD and UTD control, group maximum utilization of distributed power sources within each group is accomplished using a single MPT controller rather than independent MPT controllers, each of which is conventionally dedicated to its respective power source.

Instead of power processing from a common power source, UIVD control adopted in DISO converter architectures may achieve optimum power throughput from distributed power sources. Because different peak powers exist among non-identical power sources, near-maximum utilization of all the power sources is achieved by applying UIVD control as long as the peak power voltages of the individual sources are similar or mismatched within an acceptable tolerance (e.g., ±20%). UIVD serves as a cost-effective method of power management and distribution for DISO converters associated with their power sources that possess similar peak-power voltages.

Independent MPT (IMPT) controllers, each of which are dedicated to each respective power-processing channel per power source, may independently track the peak powers delivered from their distributed power sources without adopting the UIVD control. This IMPT control approach not only increases the parts count on MPT controllers but also significantly increase the system bus voltage and current ripples due to the accumulated perturbation ripples. The accumulated perturbation ripples occur when many IMPT power channels are activated in tandem to form a system bus voltage.

For different groups of DISO converters, output voltages of all DISO-converter groups may be series connected to achieve a higher bus voltage. This enables significant cost saving in size and weight of power transmission cables. Furthermore, IMPT controllers are not necessary in some embodiments since MPT among different groups of the distributed power sources does not need to occur in unison.

Demonstrated herein is a single MPT controller. The MPT controller is studied through modeling and simulation with clustering groups of DISO converter architectures to track a system's maximum power point. A UTD control may track the maximum power point to support clustering flows of maximum power extracted from the different groups of the distributed power sources.

Each distributed power source is independently connected across the input port of its respective DISO converter. Within each group of DISO converters, UIVD control is also adopted to allow their distributed sourcing voltages to be uniformly tracked to the group's peak power voltage (or the peak power voltage of the strongest power source within the same group of distributed power sources).

For all series-connected-output groups of DISO converters with non-identical power sources, the unified MPT/UTD/UIVD system controller enables an ideally optimum power transfer from numerous groups of distributed power sources. Because of the properly integrated control approaches, which involve MPT, UTD, and UIVD control schemes, power processing through a single MPT controller provides tolerance of multiple short-circuit faults across converter inputs. The single MPT control also minimizes amplitude of the AC bus current ripple since one clustering group of distributed power sources is actively controlled by a single time-shared MPT controller instead of all independent MPT controllers. Normally, the independent MPT controllers are conventionally activated in tandem at all times for all clustering groups of distributed power sources.

Furthermore, the revised MPT controller design is less complex than those used in the previous studies. During fault conditions, the distributed maximum-power voltages are controlled for the remaining functional sources from which the total source power is kept as close as practical to the summation of the ideal peak power values of the remaining functional power sources.

Battery Dominated Power System

Figure 2:
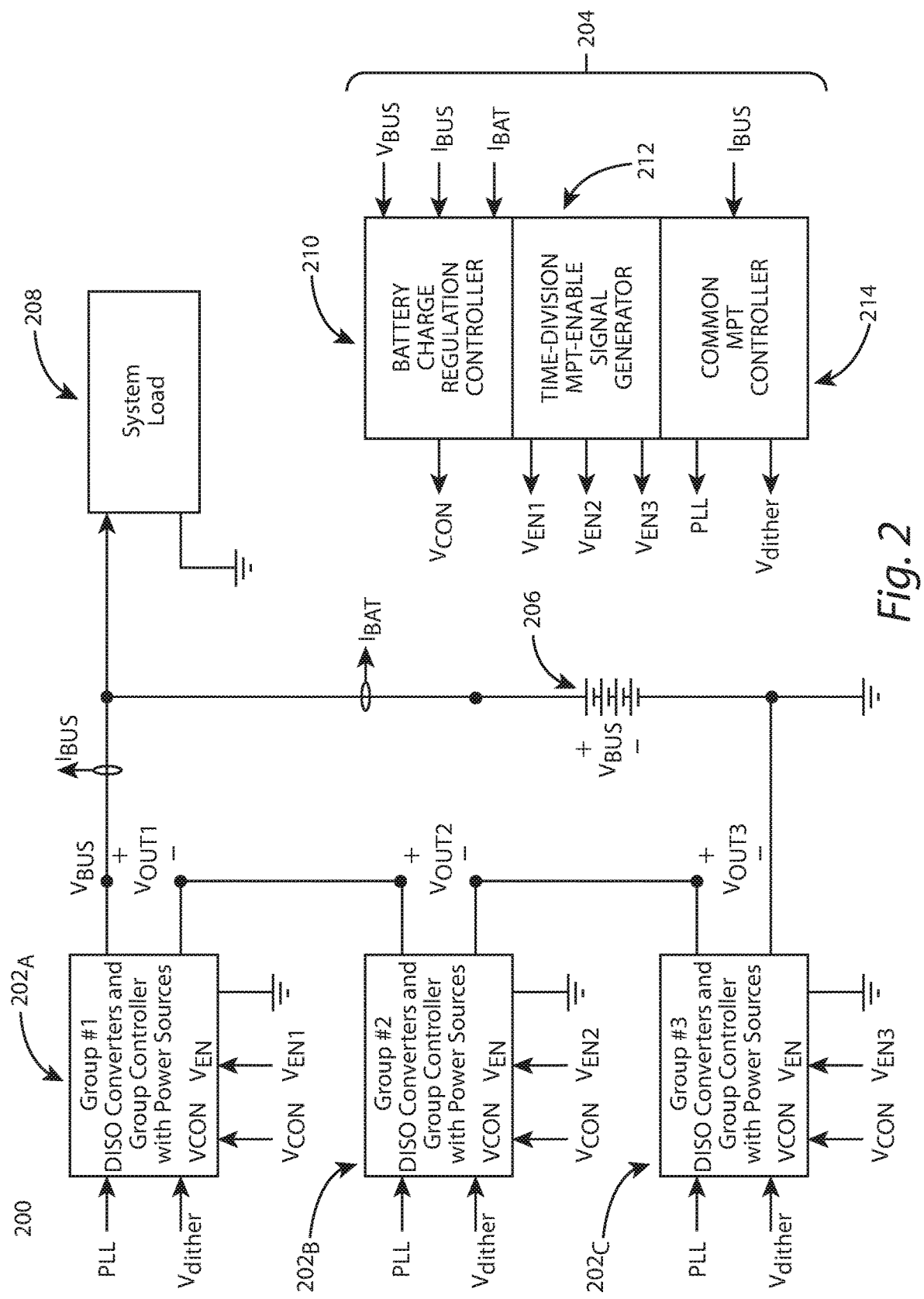
FIG. 2 is a circuit diagram illustrating a battery-dominated power system, according to an embodiment of the present invention.

FIG. 2 is a circuit diagram illustrating a battery-dominated power system 200, according to an embodiment of the present invention. In an embodiment, battery-dominated power system 200 includes 3 groups of DISO converters $202_A$, $202_B$, and $202_C$ with their series-connected group's output voltages across battery 206.

In FIG. 2, three groups of DISO converters $202_A$, $202_B$, and $202_C$ are interconnected with their outputs series-connected across a battery bank 206 having an output voltage $V_{BUS}$. For example, each group of DISO converters $202_A$, $202_B$, and $202_C$ may include three distributed-input series-output converters (see FIG. 3) with their outputs series-connected together to form the DISO group output voltage $V_{OUTi}$, where i=1, 2, or 3.

In this embodiment, system load 208 may terminate across system output voltage $V_{BUS}$, which becomes a battery-dominated voltage bus. Each converter $302_A$, $302_B$, and $302_C$ (see FIG. 3), which has its input connected to a distributed power source and is located within a DISO converter group, may share one or more of the following attributes:

(a) includes a shared-bus control input SBi, which allows an external signal to take control of the converter power stage;

(b) represents a number of parallel-connected converter modules configured with shared-bus control inputs tied together to form a common shared-bus control port to achieve nearly uniform current-sharing;

(c) operates in a standalone configuration where the output is regulated at a pre determined voltage and its shared-bus input is left unconnected; and (d) provides electrical isolation between input and output.

System controller 204 in this embodiment includes a battery charge regulation controller 210, time-division MPT-enable signal generator 212, and a common MPT controller 214. As shown in FIG. 2, battery charge regulation controller 210 receives three input signals—battery-bus voltage $V_{BUS}$, system bus current $I_{BUS}$, and the charging battery-bank current $I_{BAT}$—and output control voltage signal $V_{CON}$.

Output control voltage signal $V_{CON}$ serves as a system control voltage to control all of three groups of DISO converters $202_A$, $202_B$, and $202_C$ such that the battery charge current $I_{BAT}$ is regulated at a preassigned value ($I_{CMD}$). This preassigned value ($I_{CMD}$) is set as a function of battery voltage $V_{BUS}$ (or $I_{CMD}=f(V_{BUS})$ profile). Time-division MPT-enable signal generator 212 may deliver enable voltage signals $V_{EN1}$, $V_{EN2}$, and $V_{EN3}$ (see FIG. 22) to enable an active group-MPT control on one group of power sources at a time. Common MPT controller 214 (see FIG. 2) may receive system bus current $I_{BUS}$ and output a dither voltage signal $V_{dither}$ and a phased lock loop (PLL) voltage. Dither voltage signal $V_{dither}$ and PLL are used by each distributed gated-integrator per group of power sources (group #i power sources and DISO converters).

Figure 3:
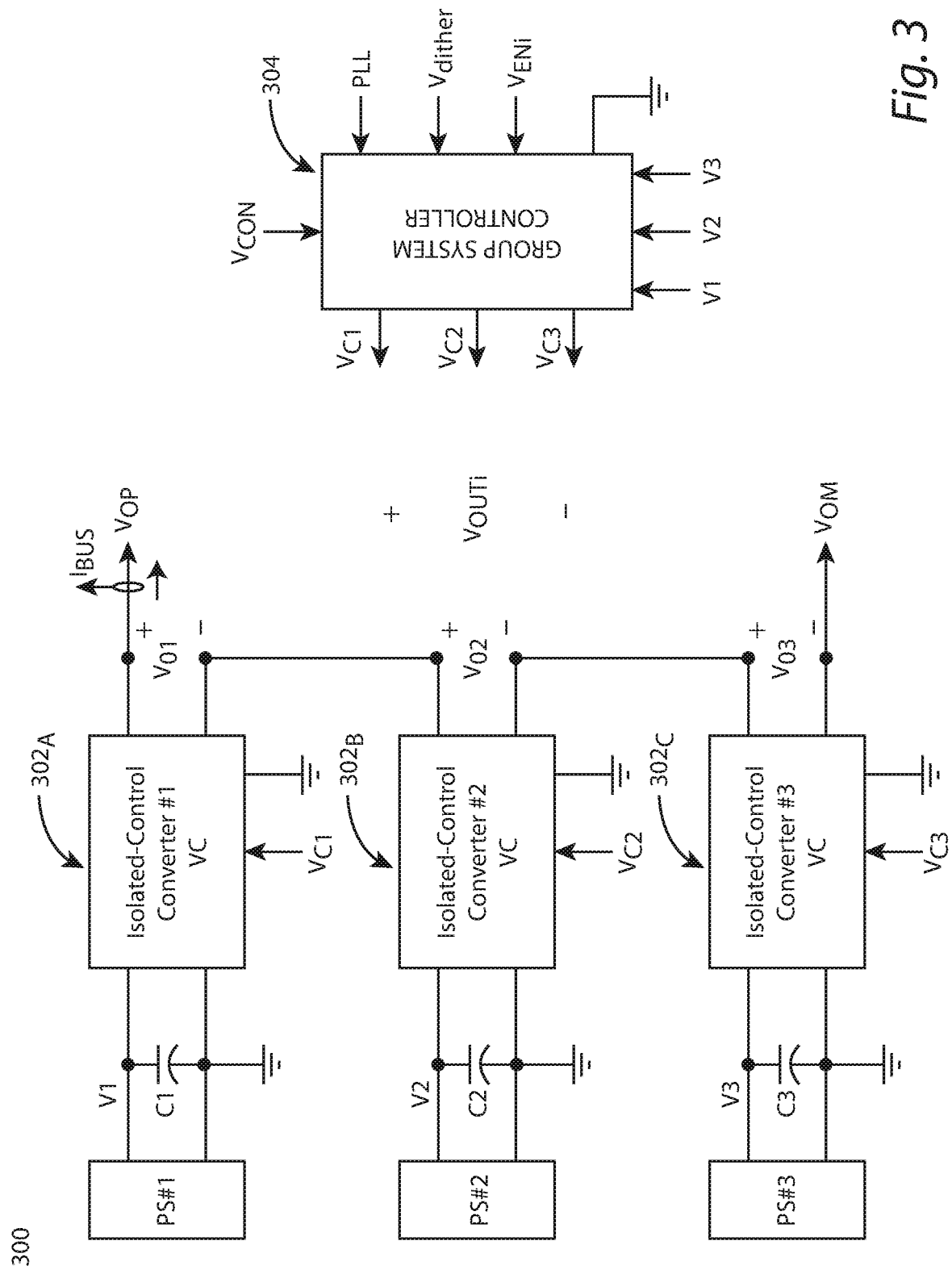
FIG. 3 is a circuit diagram illustrating a group-level system controller and controlled group of DISO converters employed within the battery-dominated power architecture of FIG. 2, according to an embodiment of the present invention.

Employed within each group of DISO converters $202_A$, $202_B$, and $202_C$ is a group-level system controller and a controlled group of DISO converters. FIG. 3, for example, is a circuit diagram illustrating a group-level system controller 304 and controlled group of DISO converters $302_A$, $302_B$, and $302_C$ employed within the battery-dominated power architecture of FIG. 2, according to an embodiment of the present invention.

In this embodiment, group-level system controller 304 provides at least the following basic control functions: (1) system distributed input-voltage regulation, (2) UIVD, and (3) provision of a group maximum power voltage $V_{SPTi}$. Each group of DISO converters (or isolated-control converters) $302_A$, $302_B$, and $302_C$ include a bus stabilizer network terminated across group output $V_{OUTi}$ located as close to the group-level system output port as possible. This way, alternating current (AC) energy may be damped out to ensure the group-level system stability.

Figure 4A:
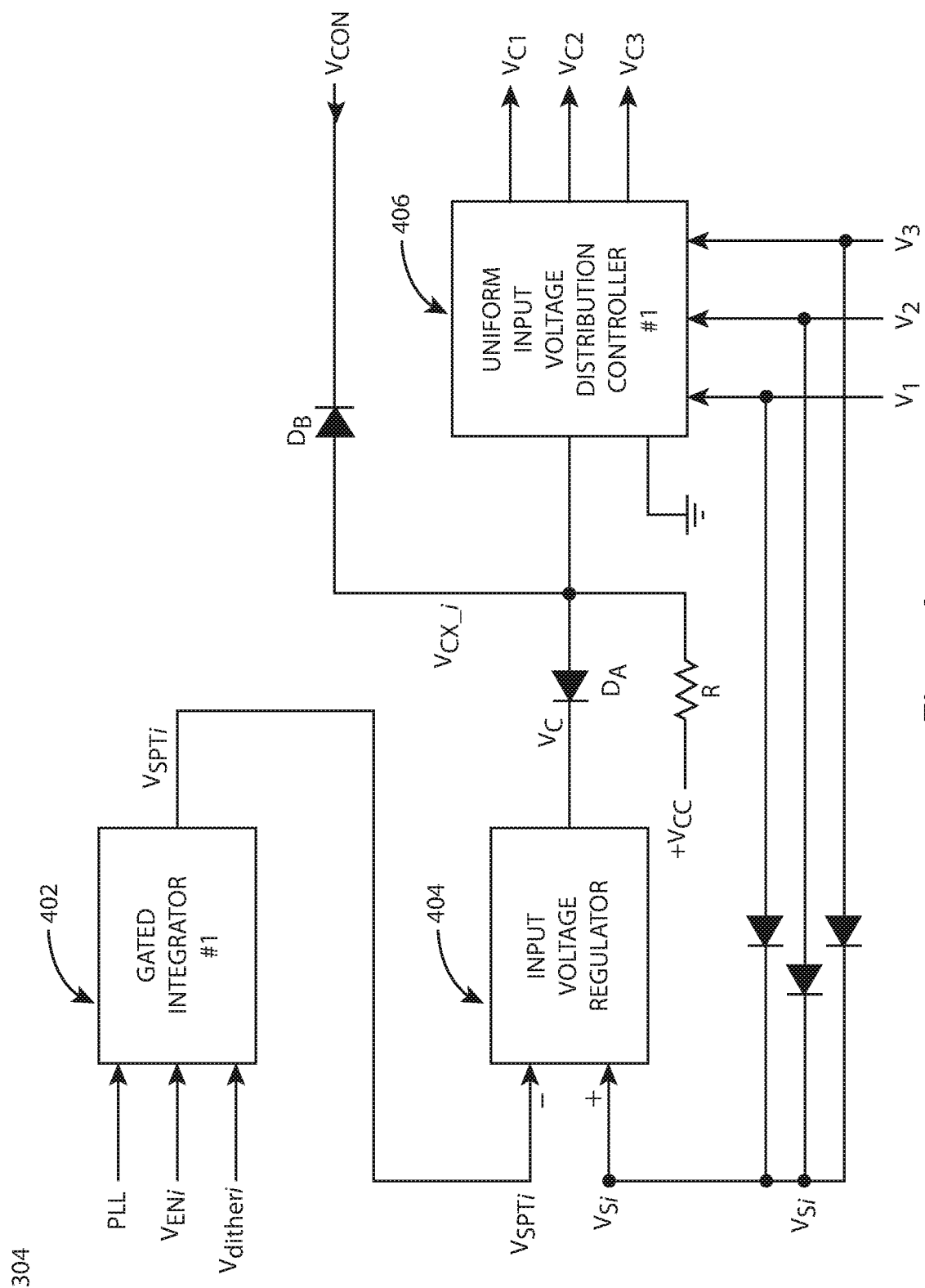
FIG. 4A is a circuit diagram illustrating a system controller for the $i^{th}$ power group of DISO converters, according to an embodiment of the present invention.

FIG. 4A is a circuit diagram illustrating a group-level system controller 304 for the $i^{th}$ power group of DISO converters, according to an embodiment of the present invention. In this embodiment, system controller 304 includes a gated integrator 402, an input voltage regulator 404, and a UIVD controller 406. The group-level system controller 304, as shown in FIG. 4A, provides a multiple-fault-tolerant coverage, since the input voltage regulator controller has the strongest distribution voltage signal $V_S$ as its feedback input instead of a particularly selected input voltage. In some cases, the selected input voltage may not be the strongest one. Thus, since distribution voltage signal $V_S$ is the maximum-limit voltage, that is, the maximum voltage detected from those of the three power sources or $V_S$=MAX (V1, V2, V3), as shown in FIG. 4A, input voltage regulator 404 may provide active control on distribution voltage signal $V_S$ to follow the command set-point voltage signal $V_{SPTi}$.

Within each converter group, there exists a converter's input voltage. This input voltage is the highest among all the distributed-input voltages while they are controlled to have a uniform distribution at all times. This maximum-limit input voltage regulation may allow the converter power system to tolerate more than one failure due to short-circuit or open-circuit of power sources and/or short-circuit or overload across distributed inputs of DISO converters. Whenever a group-i enable signal $V_{ENi}$ becomes active (i.e., in a "high" logical state), $i^{th}$ gated integrator 402 is activated. In such an embodiment, $i^{th}$ gated integrator 402 may continue the time integration of MPT controller's output signal PLL with respect to the reference voltage signal $V_{REF}$.

Figure 8:
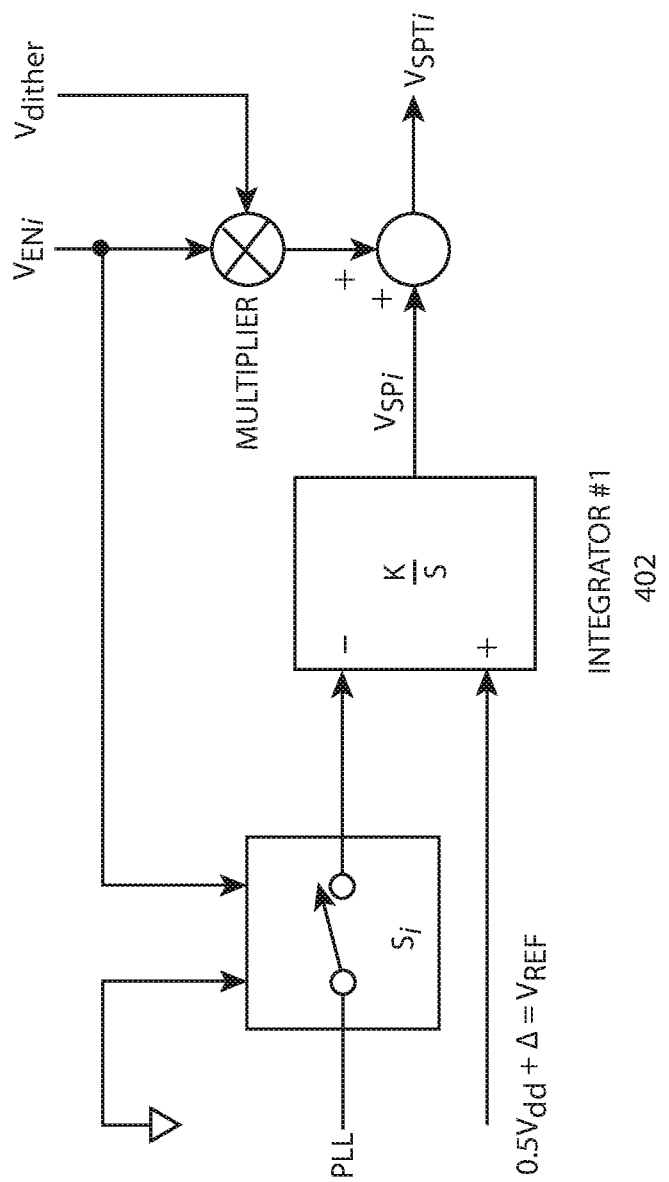
FIG. 8 is a circuit diagram illustrating a gated integrator #i of FIGS. 4 and 6, according to an embodiment of the present invention.

As shown in FIG. 8, integrator's #i 402 output signal $V_{SPi}$ is updated to approach a value corresponding to the group-i peak-power voltage. The active "high" enable signal $V_{Eni}$ allows the AC dither signal $V_{ditheri}$ to be superimposed on $V_{SPi}$. This results in the composite peak-power set-point voltage $V_{SPTi}$. In some embodiments, composite peak-power set-point voltage $V_{SPTi}$ serves as a commanding setpoint voltage for the closed-loop regulation of the dominating group-i sourcing input voltage. See, for example, distribution voltage signal $V_S$ of FIG. 4A. The remaining inactive enable signals $V_{Enj}$, where j is not equal to i, are used to hold the last previously updated outputs of their respective gated-integrators. Furthermore, the AC dither signal is absent in $V_{SPTi}$.

Returning to FIG. 4A, in some embodiments, at any time, one group of power sources and DISO converters may contribute to an AC ripple, which is superimposed on the system bus current, $I_{BUS}$. This may occur while the remaining power groups are controlled without adding more AC ripple to system output current $I_{BUS}$. This may reduce the bus voltage's AC ripple at the dither frequency.

Active regulation of either the system bus voltage $V_{BUS}$ (see FIG. 5) or the battery charge current $I_{BAT}$ (see FIG. 2) may lead to a forward-voltage bias across the pull-down diode $D_B$. However, when system bus voltage $V_{BUS}$ and battery current $I_{BAT}$ are respectively below the preset voltage value and the preset charge-current set-point, system controller 304 regulates the strongest group-level distributed-input voltage, MAX(V1, V2, V3), at the optimum peak-power voltage $V_{SPTi}$. In some embodiments, this may be determined by top-level MPT controller 214 of FIG. 2. See, for example, the description related to FIG. 6 for a more detailed explanation.

Figure 4B:
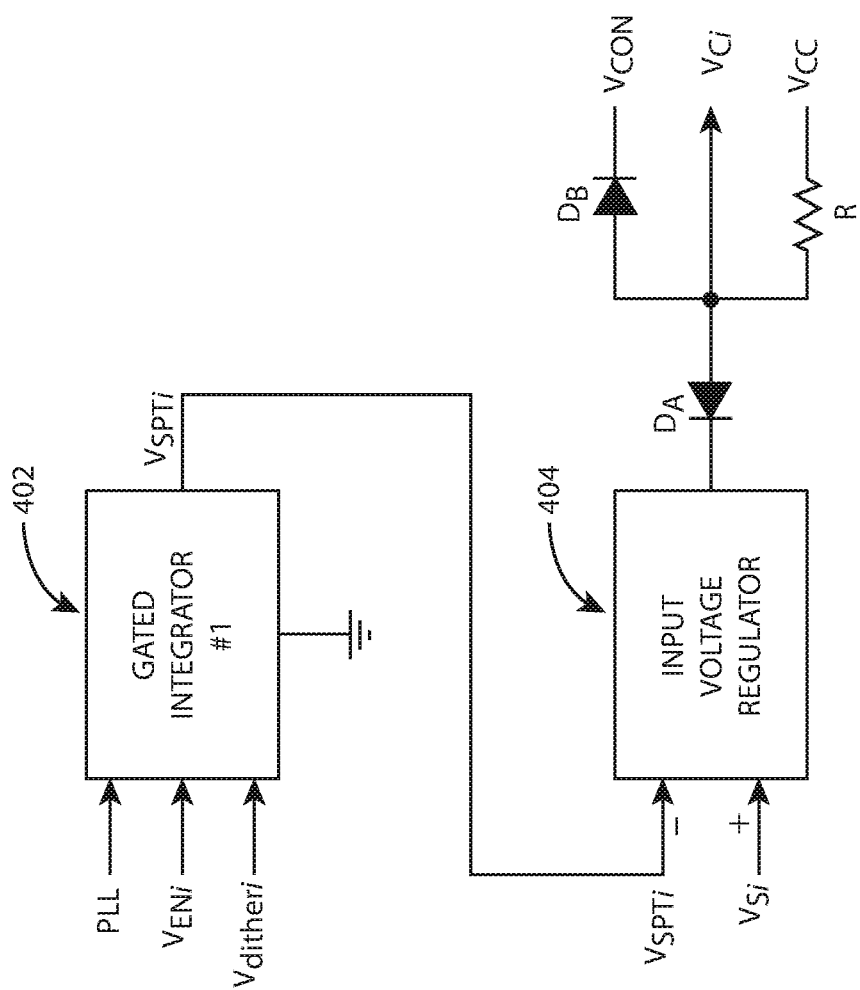
FIG. 4B is a circuit diagram illustrating a (distributed) system controlled for $i^{th}$ power source and DISO converter (only one power source per group, according to an embodiment of the present invention.

FIG. 4B is a circuit diagram illustrating a (distributed) system controller 302 for $i^{th}$ power source and DISO converter (only one power source per group, according to an embodiment of the present invention). In this embodiment, because of a single power source and a single DISO converter per group, UIVD control is no longer needed and the distributed input voltage $V_i$ serves as a direct feedback input for input voltage regulator 404. Only one output voltage per group is realized as $V_{OUTi}$, where $V_{O1}=V_{OUTi}$ for FIG. 4B (instead of $V_{O1}+V_{O2}+V_{O3}=V_{OUTi}$ for the controller shown in FIG. 4A).

Regulated Bus Power System

Figure 5:
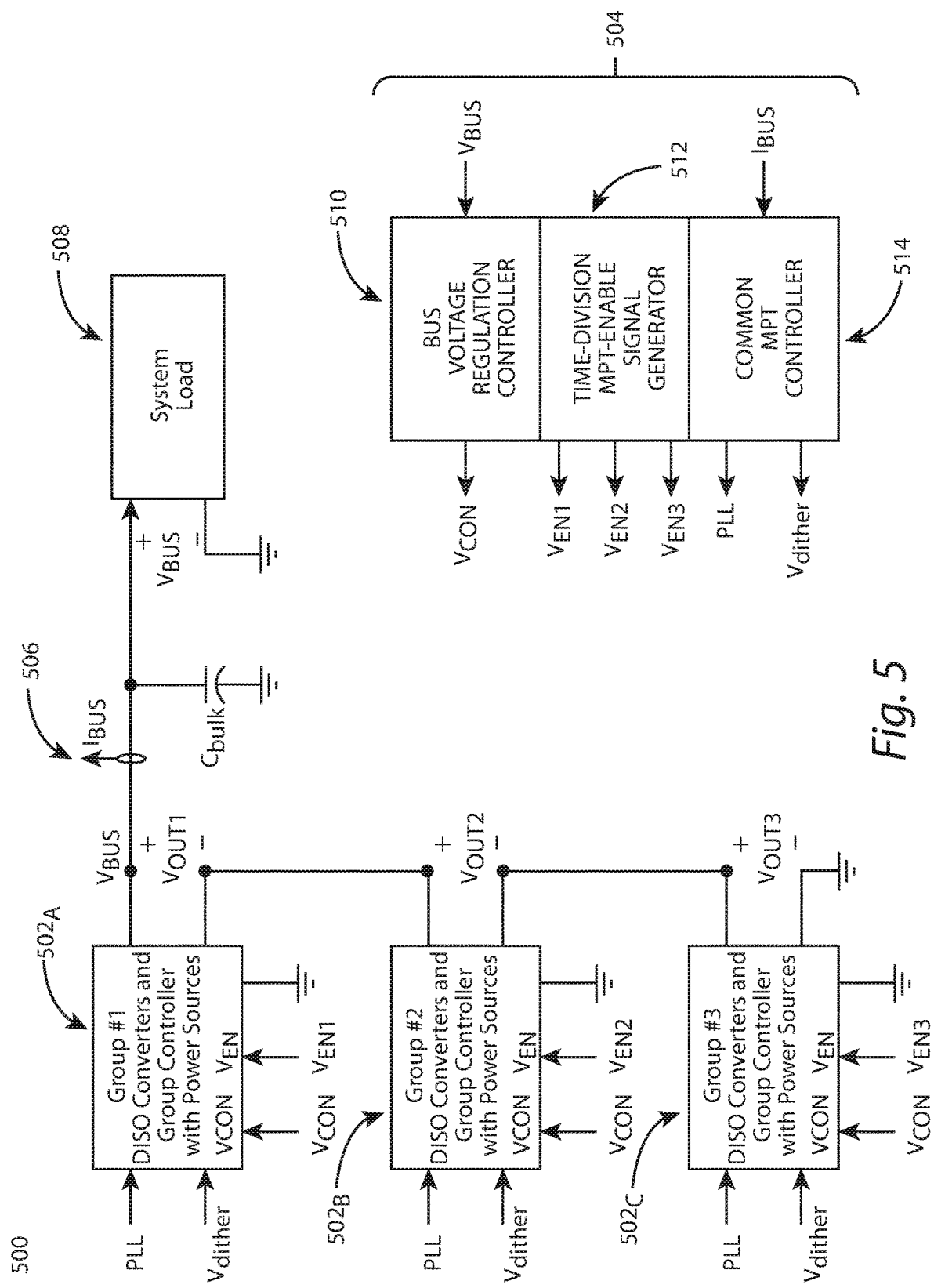
FIG. 5 is a circuit diagram illustrating a regulated bus power architecture with UTD-UIVD control, according to an embodiment of the present invention.

FIG. 5 is a circuit diagram illustrating a regulated bus power architecture 500 with UTD-UIVD control, according to an embodiment of the present invention.

In this embodiment, regulated bus power architecture 500 includes groups of DISO converters $502_A$, $502_B$, $502_C$, each of which includes three independently sourced input converters with their group outputs $V_{OUT1}$, $V_{OUT2}$, and $V_{OUT3}$ that are series-connected across a system output voltage $V_{BUS}$. System load 508 may be terminated across the system bus voltage $V_{BUS}$. Each converter within any of these three groups of isolated-control DC-DC converters $502_A$, $502_B$, $502_C$ share the same attributes as described above with respect to FIG. 2.

In this embodiment, there are two feedback input signals (the regulated-bus output voltage $V_{BUS}$ and the total bus current $I_{BUS}$) feeding system controller 504. For example, regulated-bus output voltage $V_{BUS}$ is fed into bus voltage regulation controller 510 and total bus current $I_{BUS}$ is fed into common MPT controller 514. Bus voltage regulation controller 510 delivers output control voltage signal $V_{CON}$ as the system control voltage for the system bus voltage $V_{BUS}$ to be closed-loop controlled. Further, the system bus voltage $V_{BUS}$ is regulated by at least one non-MPT group of DISO DC-DC converters with its group-level output port $V_{OUTi}$. In some embodiments, group-level output port $V_{OUTi}$ is series connected to other group-level output ports $V_{OUTj}$, where i is not equal to j.

Time-division MPT-enable signal generator 512 distributes associated voltage enable signals $V_{Eni}$ to their respective group-level system controllers, each of which is shown in FIG. 4A. When any group-level system controller #i operates in a regular regulation mode (e.g., battery charge current regulation mode shown in FIG. 2 or bus voltage regulation mode shown in FIG. 5), group-level system controller #i's MPT mode of operation is bypassed or not activated regardless of whether group-level system controller #i's MPT-enable signal VENT is active or inactive. When any group-level system controller #i operates in input voltage regulation mode, group-level system controller #i's MPT mode is in either an active tracking state (i.e., voltage enabled signal VENT is "high" and the group peak-power voltage is being updated) or a holding state in which the (dominating) group input source voltage is regulated at the previously updated peak-power voltage while voltage enabled signal $V_{EN}D$ is "low".

Common MPT controller 514 provides two output control signals—a directive tracking signal PLL and an AC perturbation voltage $V_{dither}$. The control signals are distributed to all group-level controllers for peak-power tracking operation. The directive tracking signal PLL provides a proper polarity and magnitude for each group-level controller, if being enabled for MPT tracking mode, to update the new value of the group's peak-power voltage.

When any group-level controller (usually N−1 controllers at any time) is disabled for MPT tracking mode and not operating in a regular operating mode, PLL signal is not processed (isolated) from MPT controller 514. This may allow the previous value of the group's peak power voltage be used for the group-level controller to regulate the dominating group's input voltage, MAX(V1, V2, V3), at the previous value without being perturbed by the dither signal $V_{dither}$. In this manner, only one group of DISO converters is perturbed by the dither signal $V_{dither}$, i.e., their source input voltages is controlled to include the AC dither frequency while the remaining N−1 groups of DISO converters have no dither-frequency component to be superimposed on their input voltages. Consequently, time-division MPT-enable signal generator 512 and MPT controller 514 work together to ensure that only one group of DISO converters is in MPT tracking mode. Subsequent description of PLL and dither signal $V_{dither}$ shown in time-division MPT-enable signal generator 514 (or time-division MPT-enable signal generator 214) is also depicted in FIG. 8, revealing the mutual operation among these three signals PLL, dither signal $V_{dither}$, and voltage enable signal $V_{ENi}$ to the gated integrator 402, which is located within the group-level controller.

Simply put, system controller 504 provides three basic system-level control functions: (1) system output voltage regulation of regulated-bus output voltage $V_{BUS}$ (bus voltage regulation controller 510), (2) UTD signal generator (time-division MPT-enable signal generator 512), and (3) common MPT processing (common MPT controller 514). In the same manner, a bus stabilizer capacitor $C_{BULK}$ may be terminated across system output of regulated-bus output voltage $V_{BUS}$ located as close to the system output port as possible to damp out AC energy, thereby ensuring system stability.

Regulated-bus output voltage $V_{BUS}$ is closed-loop controlled by at least one non-MPT group of DISO DC-DC converters with its group-level output port $V_{OUTi}$. Group-level output port $V_{OUTi}$ may be series-connected to other group-level output ports $V_{OUTj}$ (i not being equal to j), in some embodiments. These special output-series-connected converter groups $502_A$, $502_B$, $502_C$, significantly reduce the total size and weight of power transmission cables.

Maximum Power Tracking with Sequentially Uniform Time Distribution

Figure 6:
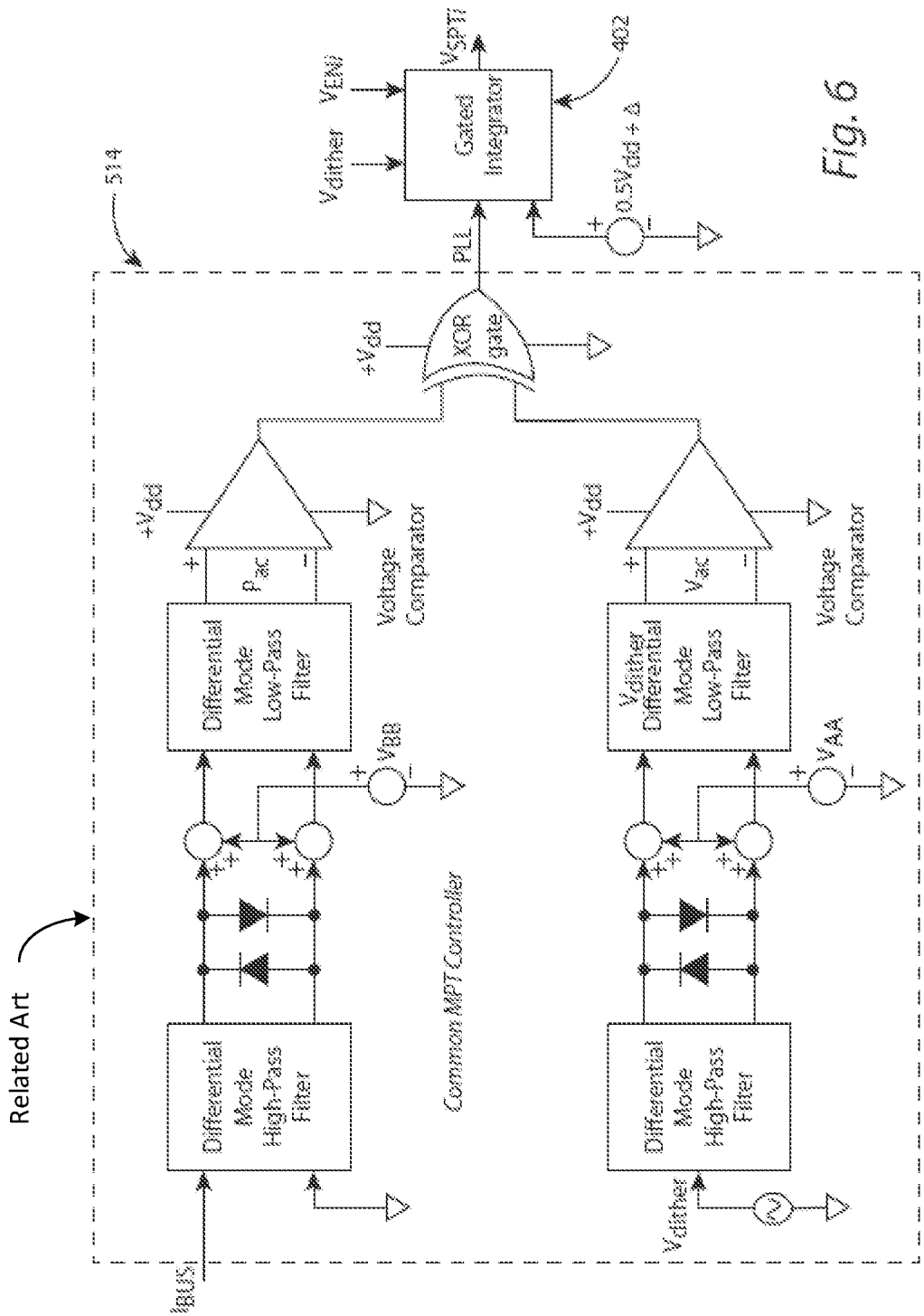
FIG. 6 is a circuit diagram illustrating a common MPT controller, according to an embodiment of the present invention.

FIG. 6 is a circuit diagram illustrating a common MPT controller 514, according to an embodiment of the present invention. It should be appreciated that the components within common MPT controller 514 is related art. Although common MPT controller 514 is shown with respect to FIG. 5, common MPT controller 514 may be incorporated within power architecture of FIG. 2.

In this embodiment, MPT controller 514 shows that outputs (PLL and $V_{dither}$) are used by each distributed gated-integrator 402 per group of power sources (group #i power sources and DISO converters). In some embodiments, $V_{dither}$ offers a noise-free reference sinusoidal voltage, which represents an AC ripple superimposed on the sourcing voltages, and is used to dither a MPT control algorithm. The MPT control algorithm may detect the right control direction toward the group peak-power voltage, in some embodiments. In this embodiment, the actual AC ripple of the sourcing voltages, which contains very noisy switching voltage, is no longer needed, since it has been conventionally used as the necessary feedback input to conventional MPT controllers. Due to the capacitive stiffness of the bus impedance offered in power architectures of FIGS. 2 and 5, the AC ripple of the actual power drawn by the bus is no longer needed. Only feedback input that may be required, however, is total bus current $I_{BUS}$. At the dither frequency of $V_{dither}$, the AC ripple superimposed on total bus current $I_{BUS}$ is in phase with the actual power ripple. This allows for the elimination of the conventional use of an analog multiplier for computation of the actual power delivered to the bus.

It should be appreciated that in some of these embodiments, at any time, only one group of power sources and associated DISO converters is controlled in MPT-enable mode. In the MPT-enable mode, the associated group of DISO converters is controlled to operate in either its regular regulation mode (e.g., battery charge current regulation mode shown in FIG. 2 or bus voltage regulation mode shown in FIG. 5) or input voltage regulation mode. Input voltage regulation mode regulates the group's distributed converter input voltages at the continuously updating group's peak-power voltage. The remaining groups of power sources and DISO converters are controlled in a MPT-disable mode. In the MPT-disable mode, the remaining groups of DISO converters are controlled to operate in either their regular regulation mode (e.g., battery charge current regulation mode shown in FIG. 2 or bus voltage regulation mode shown in FIG. 5) or input voltage regulation mode. Again, the input voltage regulation mode regulates the distributed converter input voltages at the most previously updated group's peak-power voltage.

Within one power group, let's say, for example, Group #1 (DISO Converters and Group Controller with Power Sources), the input voltage regulation mode may be active in MPT-enable mode or MPT-disable mode to regulate uniform voltages across the DISO converters' inputs at a voltage corresponding to the most recent group peak-power voltage candidate $V_{SPTi}$. See FIG. 4 or 6.

In the MPT-enable mode, a fixed small amount of AC dither signal $V_{dither}$ is superimposed on $V_{SPTi}$. In an MPT-disable mode, $V_{dither}$ is not included to $V_{SPTi}$. Only one enable signal $V_{Eni}$ is active "high" to enable the MPT mode as conceptually realized by the equal time-division MPT-Enable signal generator while the remaining enable signals $V_{Enj}$, where j is not equal to i, are inactive for disabling of the MPT mode. See, for example, FIG. 7.

Figure 7:
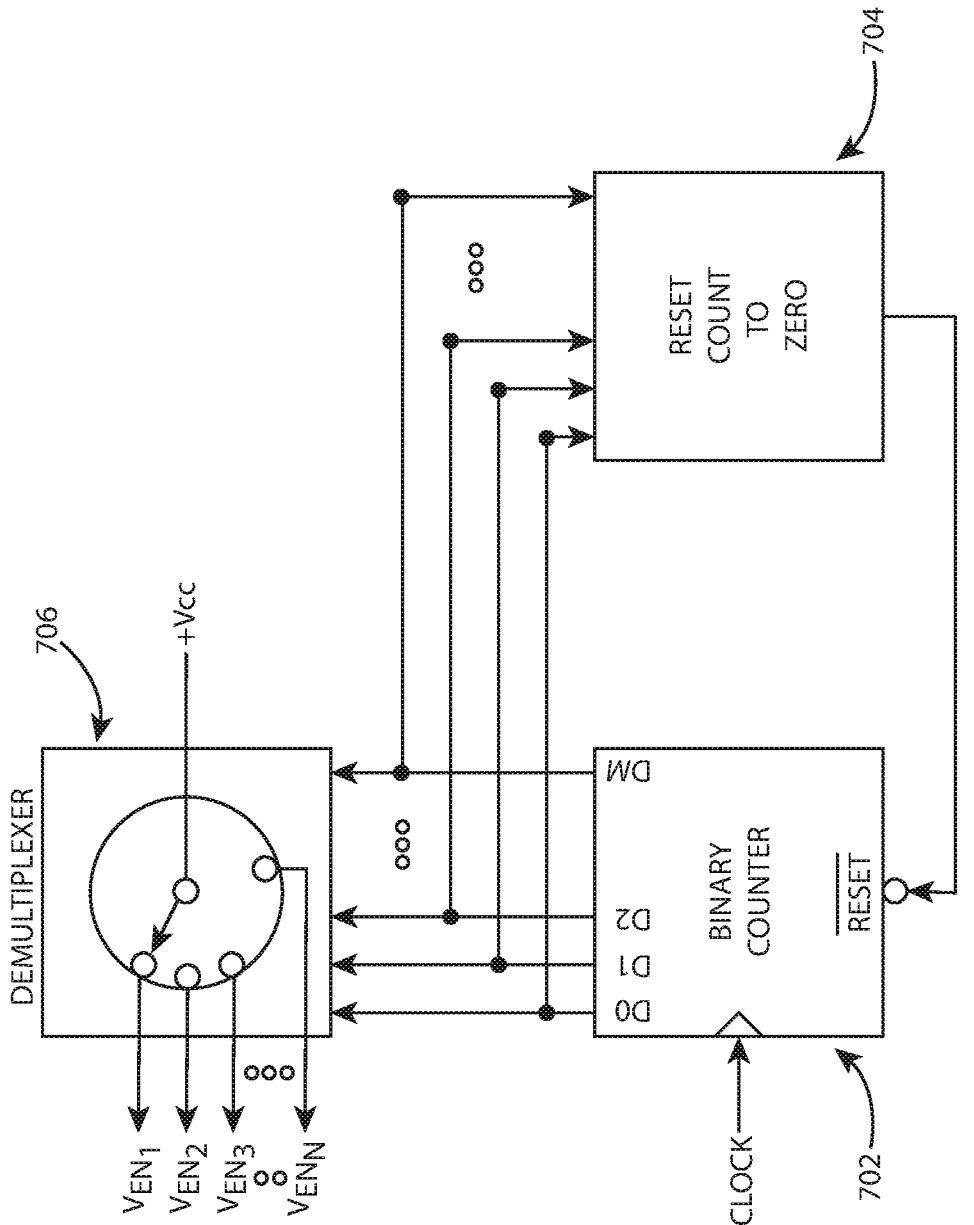
FIG. 7 is a block diagram illustrating a time-division MPT-enable signal generator, according to an embodiment of the present invention.

FIG. 7 is a block diagram illustrating a time-division MPT-enable signal generator 512, according to an embodiment of the present invention. In this embodiment, time-division MPT-enable signal generator 512 may produce sequential enable voltage signals $V_{EN1}$ ... $V_{ENN}$ with UTD. Only one enable signal $V_{Eni}$ is active "high" for enabling of the MPT-tracking mode as conceptually realized by equal time-division MPT-Enable signal generator 512 of FIG. 7, while remaining enable signals $V_{Enj}$, where j is not equal to i, are inactive ("low") to disable the MPT-tracking mode to the remaining groups of DISO converters.

In some embodiments, binary counter 702 (see FIG. 7) may have its counter output bits ($D_M$, $D_{M-1}$, . . . , D0)

increased by one (+1) every time a pulse of CLOCK signal is present. Once the increasing counter output bits reach a number "N", which is an integer corresponding to the number of the controllable DISO converter groups, "reset-count-to-zero" logic circuit 704 delivers an active "low" reset pulse to binary counter 702. The reset pulse immediately resets all of the counter output bits to be 0 (zero), and then subsequently repeats the incremental counting process. The counter output bits representing 0 (zero) causes demultiplexer 706 to assign $V_{EN1}$ to be active "high" such as at "+VCC" voltage while the remaining other $V_{ENi}$ outputs of demultiplexer 706 are assigned with "low" or "0" voltage. Similarly, the counter output bits representing "N−1" (an integer) causes demultiplexer 706 to assign $V_{ENi}$ to be active "high" such as at "+VCC" voltage while the remaining other $V_{EN1}$ outputs, where i is not equal to N−1. In this manner, only one DISO converter group is enabled for the MPT operation in the "tracking" state for updating the group's peak power voltage with a dither signal perturbation while the remaining groups of DISO converters are disabled to be in their "holding" states which hold their most recent group's peak power voltages without a dither signal perturbation. Regardless of the MPT state (in either "tracking" or "holding" state) for any DISO converter group, the system controller may bypass the MPT operation and control any DISO converter group in a regular regulation mode instead (that is, bus voltage regulation or battery current regulation).

Returning to FIG. 6, for a DISO power system that includes M groups of power sources and DISO converters, there may be K groups of power sources and DISO converters. These K groups of power sources and DISO converters may operate in their input voltage regulation mode while the remaining M−K groups of power sources and DISO converters operate in their regular regulation mode (bus voltage regulation controller 510 in FIG. 5 or battery charge current regulation controller 210 in FIG. 2). Among these K power groups, only one power group, which is in MPT-enable mode, is actively updating its group peak-power voltage (in MPT-enable mode). The remaining K−1 power groups, which are in MPT-disable mode, are respectively holding their uniform input voltages at their most recent group peak-power voltages. Each power group within the K−1 power groups may continuously retain its own most recent group peak-power voltage. This recent group peak-power voltage may be a different voltage from those belonging to other power groups within these K−1 power groups. It should be noted that that K is an integer of non-negative value and M is a positive integer, where M>K.

When a group-i enable signal $V_{ENi}$ becomes active (or is in a "high" logical state), the $i^{th}$ gated integrator is activated. This may allow for the time integration of the MPT controller's output signal PLL to continue with respect to reference voltage signal $V_{REF}$. See FIG. 8, which is a circuit diagram illustrating a gated integrator #i 402 of FIGS. 4 and 6, according to an embodiment of the present invention. In this embodiment, the gated integrator's 402 output voltage signal $V_{SPi}$ is updated to be approaching a value corresponding to the group-i peak-power voltage. Also, in this embodiment, active "high" enable signal $V_{Eni}$ allows for AC dither signal $V_{dither}$ to be superimposed on set point voltage signal $V_{SPi}$. This may result in a composite peak-power set-point voltage $V_{SPTi}$. Composite peak-power set-point voltage $V_{SPTi}$ may serve as a commanding setpoint voltage $V_{SP}$ for a closed-loop regulation of a dominating group-i sourcing input voltage signal $V_S$. See, for example, FIG. 4A.

Remaining inactive enable signals $V_{Enj}$, where j is not equal to i, may hold the last previously updated outputs of their respective gated-integrators and AC dither signal $V_{dither}$ is absent in composite peak-power set-point voltage $V_{SPTi}$. At any time, only one group of power sources and DISO converters may contribute to an AC ripple superimposed on system bus current $I_{BUS}$. The remaining power groups, however, are controlled without adding more AC ripple to system bus current $I_{BUS}$. This effectively reduces the bus voltage's AC ripple at the dither frequency.

Returning to FIG. 2, for example, battery charge regulation controller 210 may regulates battery-bank voltage $V_{BUS}$ to not exceed a preset value in accordance with its voltage-temperature (V/T) profile. This may prevent the battery from over-charging. When battery-bank voltage $V_{BUS}$ is below its preset value (pre-assigned as a function of temperature), battery-bank current $I_{BAT}$ is regulated at a preset charge-current set-point, as determined by battery charge regulation controller 210. Active battery regulation of either its battery-bank voltage $V_{BUS}$ or battery-charge current $I_{BAT}$ may lead to a forward-voltage bias across the pull-down diode $D_B$. See, for example, FIG. 4A.

However, when battery-bank voltage $V_{BU}S$ and batter-bank current $I_{BAT}$ are respectively below the preset voltage value and the preset charge-current set-point, system controller 304 may regulate strongest group-level distributed-input voltage $MAX(V_1, V_2, V_3)$ at an optimum peak-power voltage $V_{SPTi}$ determined by a top-level MPT controller. See, for example, common MPT controller 514 of FIG. 5. As long as the operating battery-bank voltage $V_{BAT}$ and battery-bank current $I_{BAT}$ are below their preset voltage/charge-current values, the DISO converter power system is controlled to have an optimum power transfer from all distributed power sources by utilizing only one common MPT controller.

Returning to FIG. 4A, this circuit diagram illustrates a conceptual control diagram associated with common MPT controller 214 of FIG. 2. This control diagram may dominate control over battery charge regulation controller 210 through the group-level primary control signal $V_{CX-i}$ and the reverse-biased diode $D_B$.

In some embodiments, one of the following three operational modes is active at any given time for a DISO converter group—(1) battery voltage regulation mode for compliance with a V/T profile, (2) battery charge-current regulation mode to control the battery current without exceeding a commanded charge rate, or (3) distributed-input voltage regulation mode for tracking a group-level system optimum-power voltage. During any of these three operating modes, UIVD controller 406 may regulate converter-input voltages within the same group of DISO converters across the distributed power sources to be equal. For instance, UIVD controller 406 may distribute three control voltage signals $V_{C1}$, $V_{C2}$, and $V_{C3}$ to their respective isolated-control converters $302_A$, $302_B$, $302_C$. See also FIG. 3.

Figure 9:
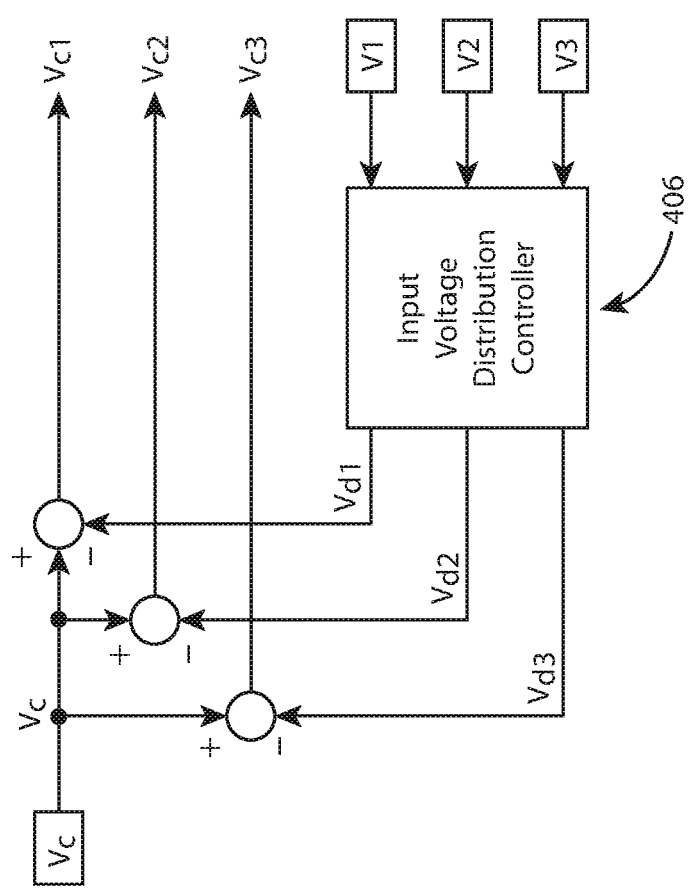
FIG. 9, which is a circuit diagram illustrating a UIVD controller for 3 DISO converters, according to an embodiment of the present invention.

As shown in FIG. 3, a DISO power system 300 include N isolated-control DC-DC converters with their respective N distributed power sources PS#1, PS#2, . . . , PS#N. During either battery voltage and current regulation or distributed-input voltage regulation, converter-input voltage distribution controller 406 of FIG. 9 is configured to produce group-level secondary control signals ($V_{d1}$, $V_{d2}$, . . . , $V_{dN}$). See, for example, FIG. 9, which is a circuit diagram illustrating a UIVD controller 406 for 3 DISO converters, according to an embodiment of the present invention. In this embodiment, secondary control signals are subtracted from primary control voltage $V_C$ to create a modified control voltage signal $V_{C1}$, $V_{C2}$, . . . , $V_{CN}$. In an embodiment, modified control voltage signal $V_{C1}$, $V_{C2}$, ..., $V_{CN}$ may regulate its respective converter to accomplish UIVD (see, for example, FIG. 4A).

Figure 10:
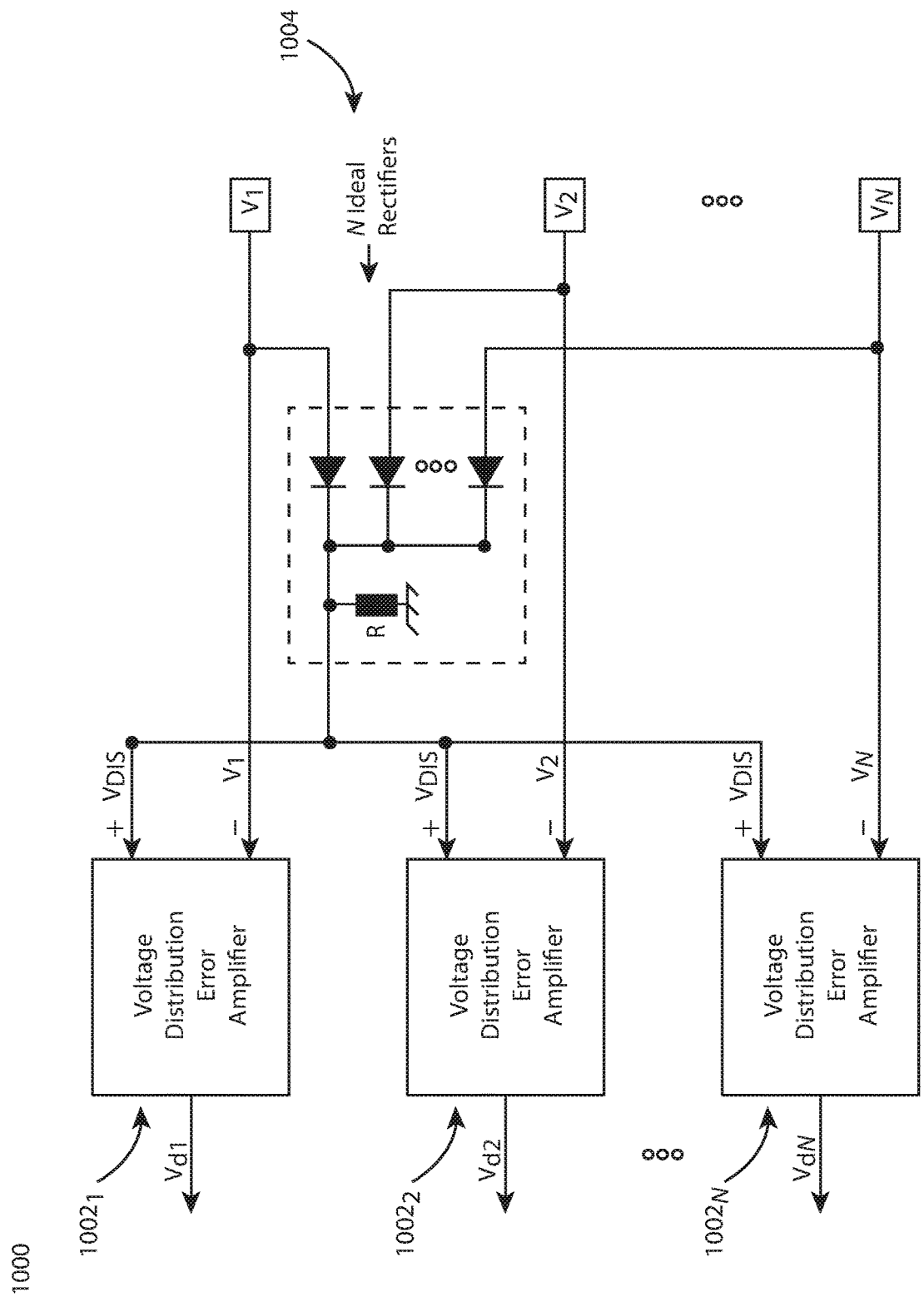
FIG. 10 is a circuit diagram illustrating a fault-tolerant UIVD controller using a maximum-limit (ML) distribution reference, according to an embodiment of the present invention.

FIG. 10 is a circuit diagram illustrating a fault-tolerant UIVD controller 1000 using a maximum-limit (ML) distribution reference, according to an embodiment of the present invention. In this embodiment, fault-tolerant UIVD controller 1000 is based on a ML distribution reference ($V_{DIS}$=MAX($V_1$, $V_2$, ..., $V_N$)).

To achieve fault tolerance, fault-tolerant UIVD controller 1000 includes a set of ideal rectifiers 1004 to produce a common distributed voltage reference signal $V_{DIS}$. Common distributed voltage reference signal $V_{DIS}$ is the highest output voltage obtained from one of the converters within the group-level DISO power system. For example, if a converter fails with its input short circuited, common distributed voltage reference signal $V_{DIS}$ is automatically updated to compensate for the loss of the failed converter or the failure of its respective input power source. For the system to tolerate at least one converter input short-circuit failure, some embodiments may include two ideal rectifiers to sense the stronger input voltage obtained from any two converters. Depending on the embodiment, UIVD controller 1000 includes N ideal rectifiers for an N-converter DISO system.

Consequently, FIGS. 4, 9, and 10 illustrate UIVD control for 3 DISO converters (N=3) with fault-tolerance. As shown in FIG. 10, a common distributed voltage reference signal $V_{DIS}$ is derived from N cathode-parallel-connected ideal rectifiers 1004 to individually sense input voltages $V_1$, $V_2$, ... $V_N$ of converters #1, #2, ..., and #N. In this embodiment, if one converter fails to build up its input voltage, the N−1 remaining converters are controlled to have uniform input voltage distribution. A protection fuse is inserted in series with either the positive input of each DISO converter or the positive output of its respective power source. The protection fuse may provide a simple method of fault clearing to prevent thermal overstress to the power system.

The dc gain for each voltage distribution error amplifier $1002_1$, $1002_2$, ... $1002_N$ shown in FIG. 10 does not need to be high to achieve uniform input voltage distribution. For instance, high dc gain within each distribution error amplifier $1002_1$, $1002_2$, ... $1002_N$ may cause the converter-input voltage distribution controller to dominate the battery charge control and the distributed-input voltage regulation modes of operation, resulting in insufficient charging to the battery bank.

As shown in FIG. 2, for example, the three groups of DISO converters $202_1$, $202_2$, and $202_3$ have their 9 outputs connected in series and their series-connected output is terminated across a battery 206. Battery 206 in some embodiments may exhibit very low impedance, so the output current $I_{BUS}$ is proportional to the total power delivered by nine power sources (three power sources per each power group, PS#1, PS#2, and PS#3). In this embodiment, a delta change in the net output current ($\Delta I_{BUS}$) delivered by the 9 DISO converters reflects a delta change in the total power delivered by the nine power sources ($P_{SOURCE}$). Superimposing a small AC dither voltage onto a uniformly controlled converter input voltage ($V_1$) of the same power group results in an AC output current signal ($I_{BUS}$) having three major phase responses: (1) $I_{BUS}$ and $V_1$ are in-phase when the DC operating voltage across the distributed converter input, V1, is below the peak-power voltage; (2) $I_{BUS}$ and $V_1$ are 180° out of phase when V1 has its DC voltage above the peak-power voltage; and (3) $I_{BUS}$ and $V_1$ are 90° out of phase when V1 is at the peak-power voltage.

Figure 11:
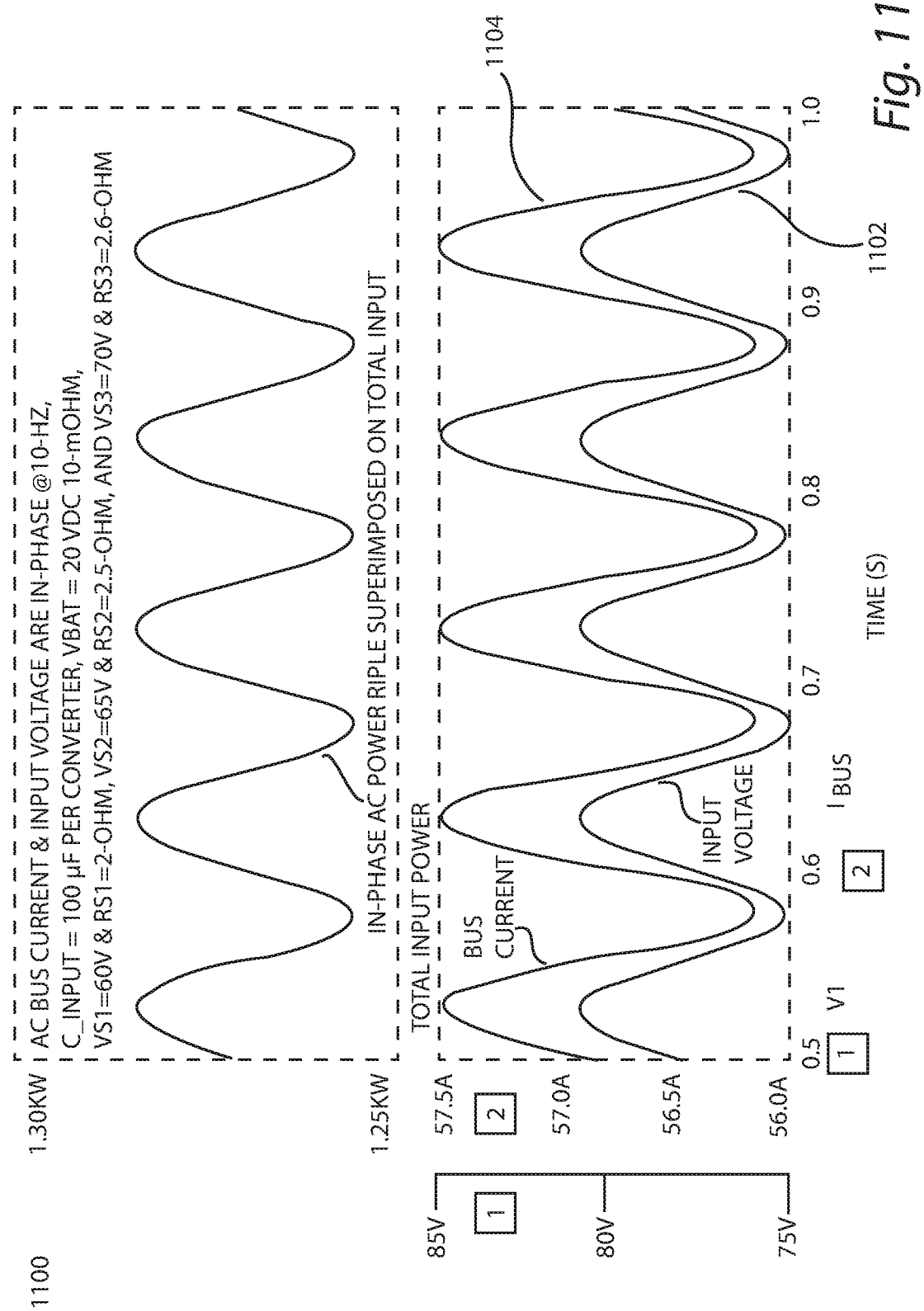
FIG. 11 is a graph illustrating a simulated in-phase AC response of distributed-input voltage V1 and system output current $I_{BUS}$ with a single MPT controller, according to an embodiment of the present invention.

FIG. 11 is a graph 1100 illustrating a simulated AC response of distributed-input voltage V1 and system output current $I_{BUS}$ with a single MPT controller, according to an embodiment of the present invention. Graph 1100 reveals an in-phase response of system output current $I_{BUS}$ (1104) with respect to V1 (1102) that has its DC operating point below the peak-power voltage.

Figure 12:
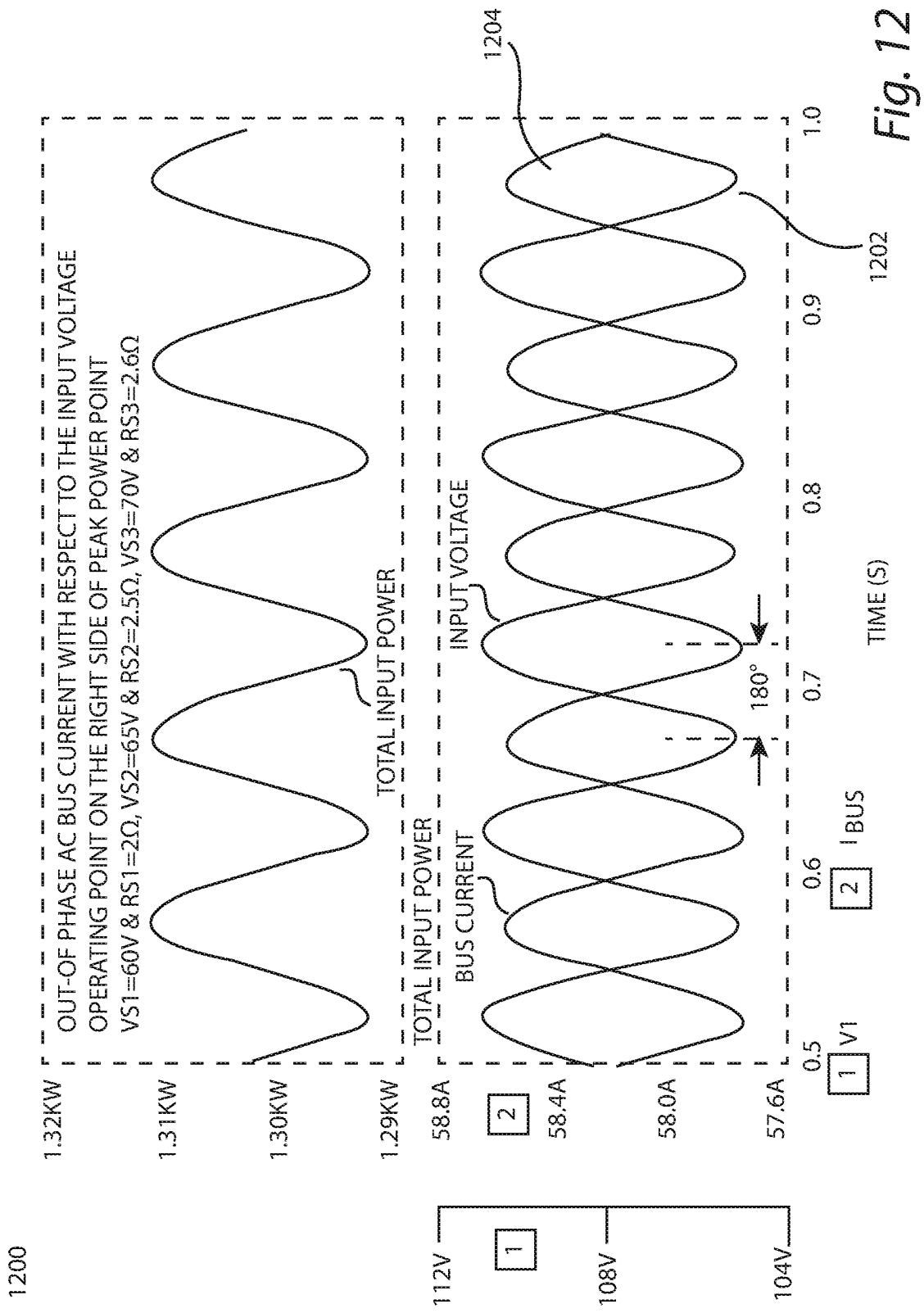
FIG. 12 is a graph illustrating a simulated out-of-phase AC response of distributed input voltage V1 and system output current $I_{BUS}$ of the same power system, according to an embodiment of the present invention.

FIG. 12 is a graph 1200 illustrating a simulated AC response of distributed input voltage V1 and system output current $I_{BUS}$ of the same power system, according to an embodiment of the present invention. Graph 1200 reveals an out-of-phase response of $I_{BUS}$ (1204) with respect to V1 (1202) that has its DC operating point above the peak-power voltage.

Figure 13:
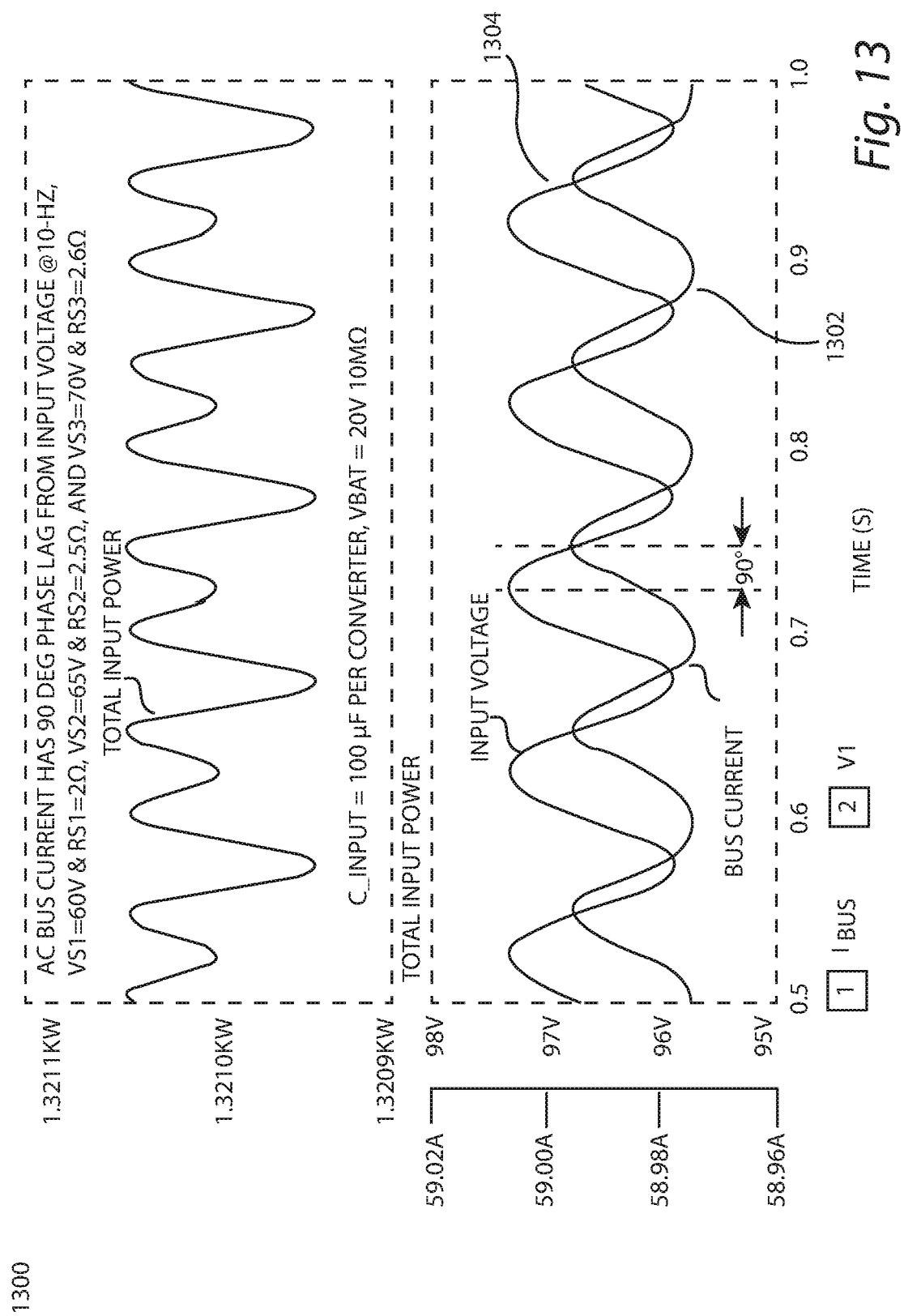
FIG. 13 is a graph illustrating a simulated 90° out-of-phase AC response of distributed input voltage V1 and system output current $I_{BUS}$ of the same power system.

FIG. 13 is a graph 1300 illustrating a simulated AC response of distributed input voltage V1 and system output current $I_{BUS}$ of the same power system. Graph 1300 reveals a 90° out-of-phase response of $I_{BUS}$ (1302) with respect to V1 (1304) that has its DC operating point at the peak-power voltage.

As shown in FIGS. 11, 12, and 13, the phase response between these two signals provides a basis for developing the MPT controllers. See MPT controllers 214 and 514 in FIGS. 2 and 5, respectively. In some embodiments, MPT controller compares AC signals ($\Delta V_1$ and $\Delta I_{BUS}$) and slowly updates set-point reference voltage signal $V_{SP}$. Set-point reference voltage signal $V_{SP}$ may command the input voltage regulator to exert a control voltage signal $V_C$ (see FIG. 4A). Control voltage signal $V_C$ may regulate the distributed-input voltage V1 or the maximum-limit (ML) input voltage $V_S$ at the group-i peak power voltage.

In some embodiments, dither-signal frequency is low (e.g., 10 Hz for simulated results shown in FIGS. 11 to 13). In these embodiments, the IVR controller (see FIG. 4A) may accomplish two functions. First, the IVR controller may regulate the DC component of the ML voltage signal $V_S$ such that it is proportional to the command set-point voltage signal $V_{SP}$. Second, the IVR controller may create the AC ripple voltage v1. AC ripple voltage v1 may follow the injected AC dither-signal. This way, the controlled AC ripple voltage, which is superimposed on the ML input voltage signal $V_S$, is in phase with the dither signal $V_{dither}$. Consequently, the MPT controller, which constantly updates the DC component of the command set-point voltage signal $V_{SP}$, may need one feedback signal, e.g., the total battery bus current $I_{BUS}$.

During operation, there is no need to feed the ML input voltage signal $V_S$ as an input signal to the MPT controller, since built-in dither-signal $V_{dither}$ already contains an AC ripple voltage superimposed on the ML input voltage $V_S$ or distributed-input voltage signal V1.

Figure 14:
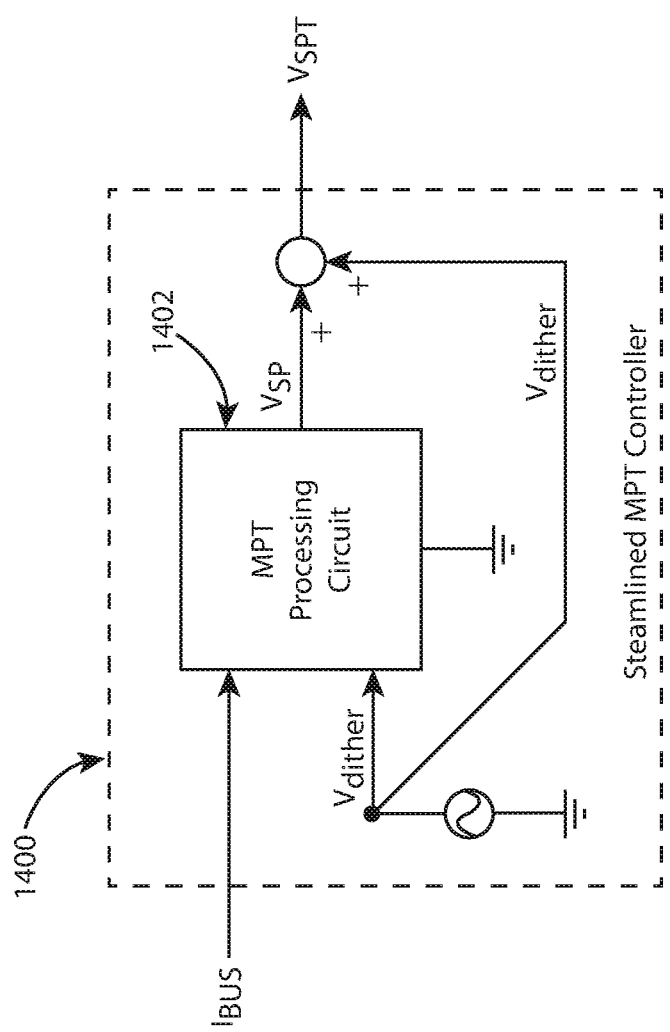
FIG. 14 is a circuit diagram illustrating a streamlined MPT controller, according to an embodiment of the present invention.

FIG. 14 is a circuit diagram illustrating a streamlined MPT controller 1400, according to an embodiment of the present invention. In this embodiment, streamlined MPT controller 1400 processes two signals, battery bus current $I_{BUS}$ and dither voltage signal $V_{dither}$, and delivers one output signal, e.g., command set-point voltage signal $V_{SPT}$. The output signal may include a slowly updated DC component signal $V_{SP}$ and an AC dither-signal $V_{dither}$.

Figure 15:
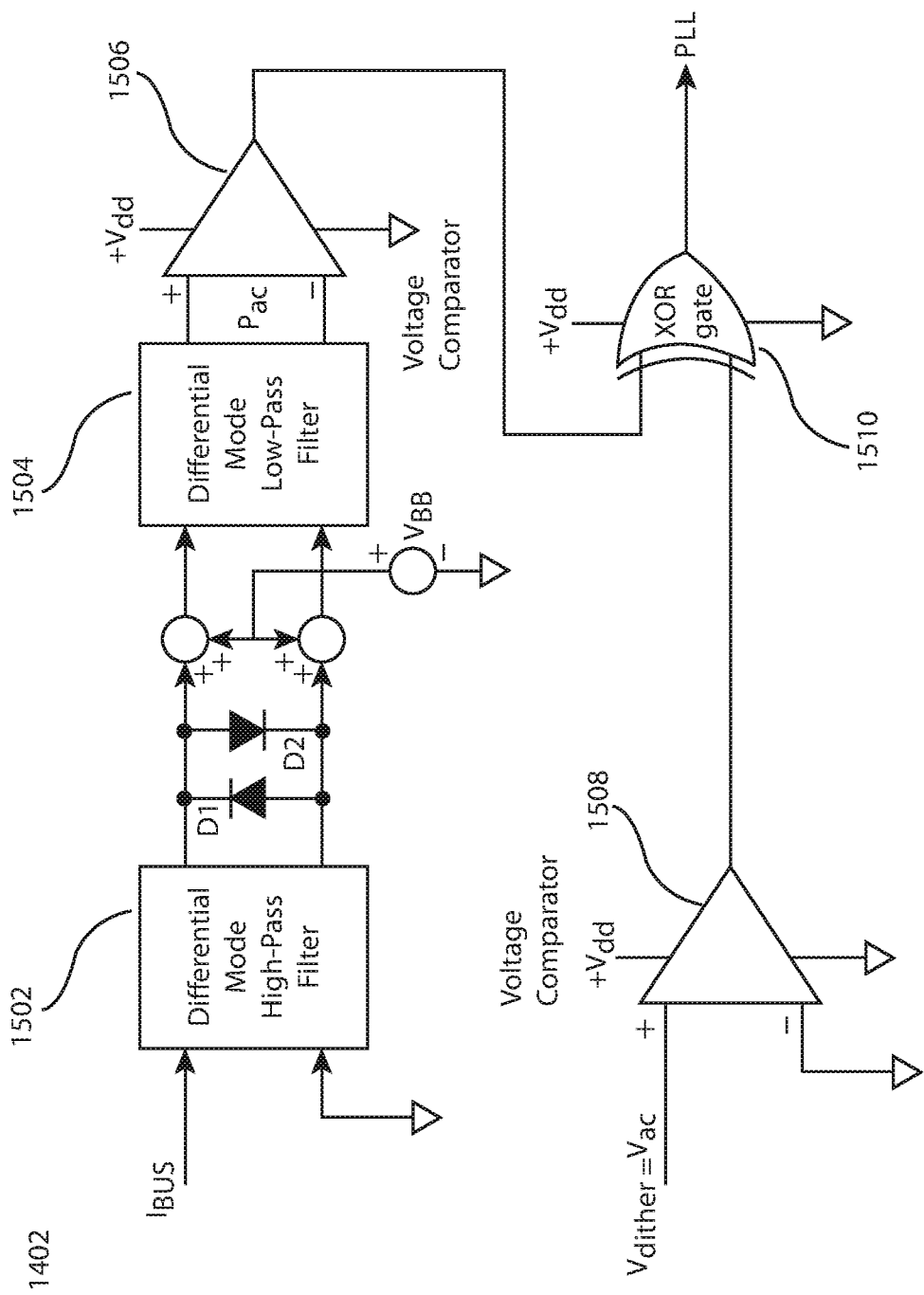
FIG. 15 is a circuit diagram illustrating a MPT processing circuit of FIG. 14, according to an embodiment of the present invention.

FIG. 15 is a circuit diagram illustrating a MPT processing circuit 1402 of FIG. 14, according to an embodiment of the present invention. In this embodiment, sensed system output current $I_{BUS}$ of the whole converter power system is the main feedback signal for MPT processing circuit 1402 and is controlled to provide a maximum output current. The front-end differential-mode high-pass filter (HPF) 1502 may remove DC content from feedback signal (system bus current) $I_{BUS}$, and provide a differential-mode AC output signal across the voltage-limiting diodes D1 and D2.

Different mode low-pass filter (LPF) 1504 and differential-mode HPF 1502 remove switching noises and extract an AC current signal from the system bus current $I_{BUS}$. The AC current signal is then biased with a common-mode voltage $V_{BB}$ to remove high-frequency noise. In this manner, the cascaded differential-mode HPF and LPF stages produce the band-limited AC power signal $P_{ac}$. In some embodiments, band-limited AC power signal $P_{ac}$ is proportional to the incremental power delivered by the solar array source.

Subsequently, a voltage comparator circuit 1506 converts band-limited AC power signal $P_{ac}$ into a logical voltage signal. Generally, another parallel path of the differential-mode HPF and LPF stages may extract the AC voltage signal $V_{ac}$ from the sensed group-input voltage signal $V_s$ shown in FIG. 4A. Since dither signal $V_{dither}$ already exists to have an in-phase response with AC voltage signal $V_{ac}$ (the ripple voltage superimposed on the sensed group-input voltage signal $V_s$), it is not necessary to use group-input voltage signal $V_s$ and the LPF and HPF circuits to extract the AC voltage. In some embodiments, AC voltage dither signal $V_{dither}$ is free from switching noise and perfectly represents AC voltage signal $V_{ac}$. AC voltage dither signal $V_{dither}$ (or AC voltage signal $V_{ac}$) is also converted into another logical voltage signal through a voltage comparator circuit 1508. The filtered dither signal $V_{ac}$ is in phase with the solar array dither voltage. Both incremental power $P_{ac}$ and AC dither voltage $V_{ac}$ signals are processed through an exclusive-OR (XOR) gate 1510 to decode their phase locked logic (PLL) signal.

Depending on the phase shift between AC power signal $P_{ac}$ and AC dither signal $V_{ac}$, the DC value of the $V_x$ signal may drift from its idle DC value, usually set to 50% of the supplying voltage to XOR gate 1510. The deviation of PLL's average voltage from its reference DC value $(0.5*V_{dd})$ provides an error voltage, $V(PLL)-0.5*V_{dd}$. The DC value of the error voltage signal has a proper polarity and magnitude. The magnitude may cause a downstream voltage integrator circuit to slowly update its set-point voltage output $V_{SP}$ toward a value corresponding to the peak-power voltage of solar array $V_{mp}$.

To ensure a proper idle state of MPT processing circuit 1402, the reference voltage $(0.5*V_{dd})$ feeding positive input of voltage integrator may be slightly reduced by a small value $\Delta$, such that the idle state of command set-point voltage $V_{SP}$ corresponds to the array voltage just below the array peak-power voltage. This way streamlined MPT controller 1400 of FIG. 14 may stay in an idle state and be triggered for active maximum power tracking as soon as the sensed solar array voltage reduces to the idle set-point voltage of $V_{SPMIN}$.

Conventionally, a solar array voltage or a source input voltage $V_{INj}$ is used instead of dither voltage signal $V_{dither}$ to extract the AC signal $V_{ac}$, which is superimposed on input voltage $V_{INj}$. However, due to the presence of the closed-loop input voltage regulation (see FIG. 4A), the fundamental AC component of source input voltage $V_{INj}$ is actually controlled to be in phase with the dither signal $V_{dither}$. In fact, dither signal $V_{dither}$ is not only in phase with the fundamental AC component of $V_{INj}$ but also free from the switching noise that usually exists as part of the power converter's responses (converter input/output voltages/currents). This results in a far better signal-to-noise ratio for accurate tracking of the peak power voltage.

According to FIGS. 4A and 4B, when the DISO power system does not have a need to regulate the BUS voltage (see FIG. 5) or the battery charge current (see FIG. 2), diode $D_B$ may be absent (i.e., diode $D_B$ is not needed). For this to occur, the system load may possess either the minimum amount of load power to prevent the bus voltage or the battery voltage from being excessive, i.e., the bus or battery voltage remains in an acceptable voltage range without causing a voltage over-stress to the power components or the battery. Alternatively, the capability of shunt regulation of its own load voltage, i.e., the load system is equipped with a shunting load voltage regulator (not shown). Therefore, when the load system is capable of self-regulation or self-limiting of the system load voltage not to exceed a safe level of the bus voltage which is also safe to the battery (FIG. 2) and the system bus voltage (FIG. 5), then the bus voltage regulation controller or the battery charge current regulation controller is excluded from the system controller. In this manner, the battery voltage bus configuration may include the DISO power system without the battery charge current regulation controller. Further, the unregulated voltage bus configuration of the DISO power system may include the DISO power system without the bus voltage regulation controller.

Simulation of 3 Groups of DISO-Converters

Figure 16:
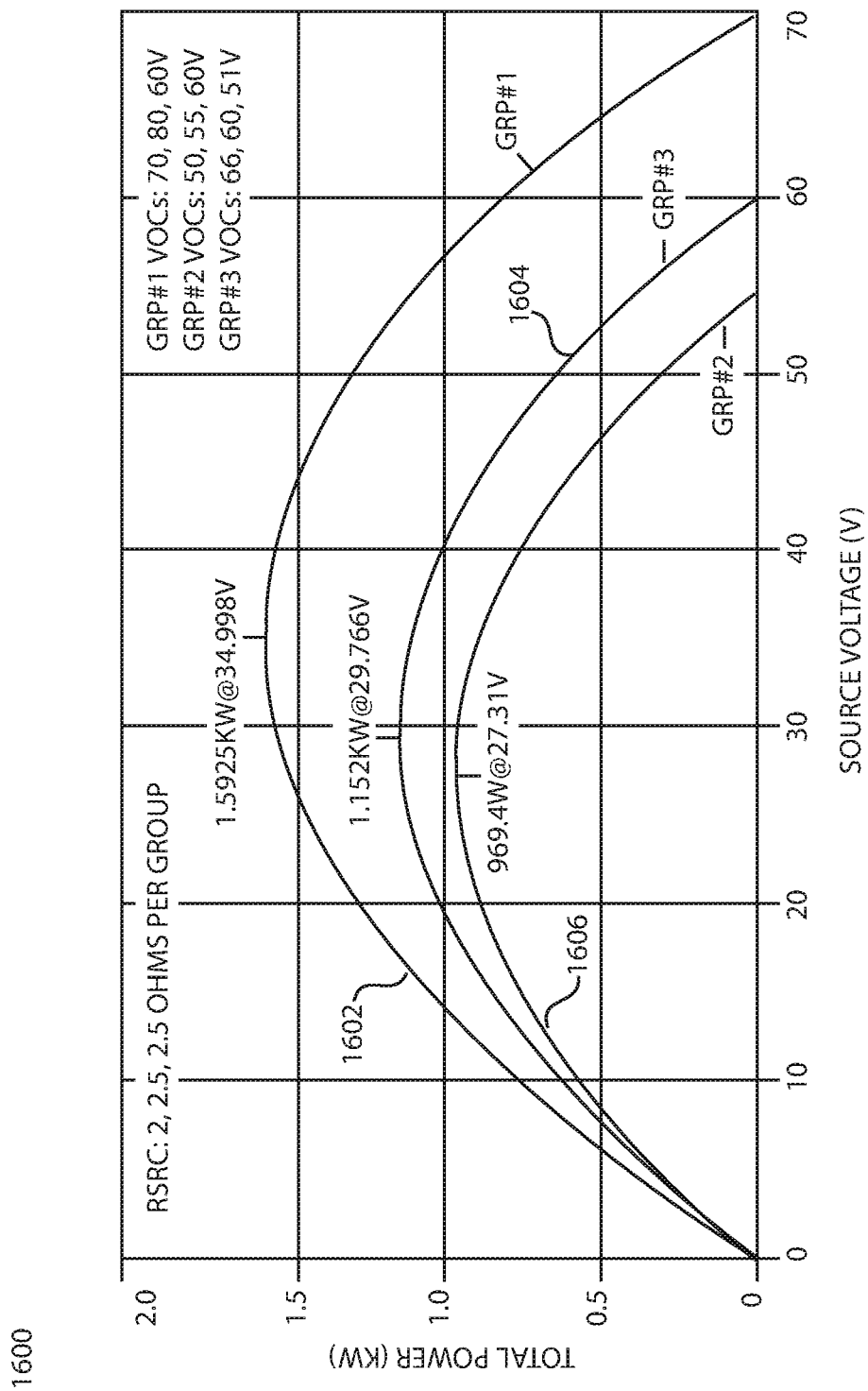
FIG. 16 is a graph illustrating simulated P-V DC characteristics of a total sourcing power for each power group as a function of the group sourcing voltage under UIVD control, according to an embodiment of the present invention.

Simulation of Power-Voltage Characteristics Per Each Group of Power Sources Under UIVD FIG. 16 is a graph 1600 illustrating simulated P-V DC characteristics of a total sourcing power for each power group as a function of the group sourcing voltage under UIVD control, according to an embodiment of the present invention. In graph 1600, three overlaid plots 1602, 1604, and 1606 of the simulated P-V characteristics (power versus source voltage) are shown. Each P-V plot 1602, 1604, and 1606 is independently derived according to the ideal UIVD control to the three DISO converters associated with each power group. The three static P-V characteristics are plotted for three respective groups of power sources, which were previously shown in FIG. 2 or FIG. 5.

Battery-Dominated Power System Simulation

A PSPICE model of the battery-dominated bus power system with three DISO converters and three distributed power sources per power group, as shown in FIG. 2, was developed and simulated to verify the basic functionality of each active control loop. In the model, each active control loop provides power management for three groups of distributed power sources. To verify the fundamental control behavior, the MPT controller was enabled, and a solar array set-point voltage signal $V_{SPT}$ was autonomously updated by the MPT controller. The solar array set-point voltage signal $V_{SPT}$ commands the input-voltage regulation control loop to regulate the distributed source input voltages $V_1$, $V_2$, and $V_3$, at the group's optimum power point voltage associated with each group of power sources.

After verifying the basic functionality of the DISO power system shown in FIG. 2, the MPT controller was extensively simulated. Power sources PS#1, PS#2, and PS#3 associated with each power group have different open-circuit voltages as follows: 70, 80, and 60 VDC for group-1 DISO converters; 50V, 55V, and 60V for group-2 DISO converters; and 66V, 60V, and 51V for group-3 DISO converters, respectively. The source resistances of 2.0 Ω, 2.5Ω, and 2.5Ω, are respectively distributed within power sources PS#1, PS#2, and PS#3 for each power group.

Figure 17:
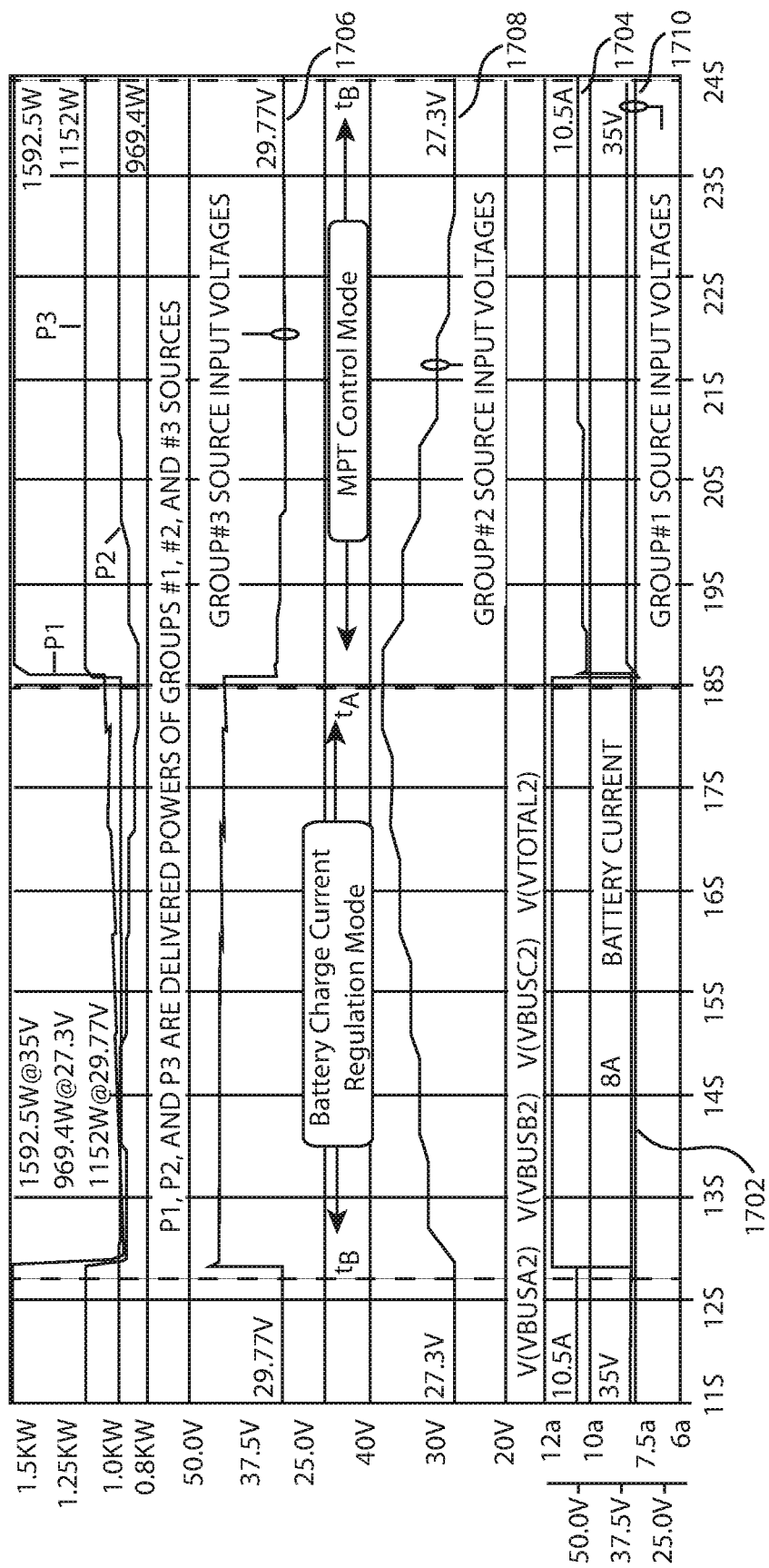
FIG. 17 is a graph illustrating simulated response of 3 groups of DISO converters (3 DISO converters per group) shown in FIG. 2 during both input voltage regulation with GT_UVD and battery-charge current regulation modes of operation, including transient transitions between these two modes, according to an embodiment of the present invention.

FIG. 17 is a graph 1700 illustrating simulated response of 3 groups of DISO converters (3 DISO converters per group) shown in FIG. 2 during both input voltage regulation with GT_UVD and battery-charge current regulation modes of operation, including transient transitions between these two modes, according to an embodiment of the present invention. For example, FIG. 17 shows the simulation result that demonstrates a mode transition from the input-voltage regulation mode to the normal battery-charge current regulation mode. In this simulation, the charge-current set-point reference is reduced from far above 12 A to about 8.0 A at around time t=12.3 s. This change in the charging set-point reference command causes the battery current to drop from 10.5 A to 8 A (plot 1702 of FIG. 17), and the distributed source input voltages $V_1$, $V_2$, and $V_3$, of group #1's power sources to increase from 35 V (at time $t_B$=12.3 s) to 57 V (at time $t_A$=18 s as shown on plot 1710 of FIG. 17). During both modes of operation in steady state and their transient mode transitions, the three distributed source voltages (3 uniform input voltages per group for three groups) across the individual inputs of three respective converters per each group of power sources are controlled to have uniform distribution at all times. This is shown in three overlapping traces on each of the three lower plots 1706, 1708, and 1710 (for 29.77 V, 27.3 V, and 35 V of group #3's, group #2's, and group #1's source input voltages, respectively).

In these embodiments, the MPT controller is active during the input-voltage regulation mode. This way, the source input voltages, which contains a 20-Hz sinusoidal voltage $V_{DITHER}$ providing a sequentially continuous perturbation to all 9 source voltages (active 20-Hz perturbation for three power sources in each power group at a time) and subsequently produces a 20-Hz response, is superimposed on the total bus current $I_{BUS}$. The MPT controller extracts the 20-Hz frequency component within total bus current $I_{BUS}$ and processes the extracted 20-Hz frequency component to update the system optimum command peak-power voltage signal $V_{SP}$. System optimum command peak-power voltage signal $V_{SPT}$, which consists of $V_{SP}$ and a small-amplitude dither signal $V_{DITHER}$, serves as the command voltage signal for regulation of the feedback voltage $V_{DIS}$. Feedback voltage $V_{DIS}$ is the maximum-limit distribution reference as shown in FIG. 10.

Figure 18:
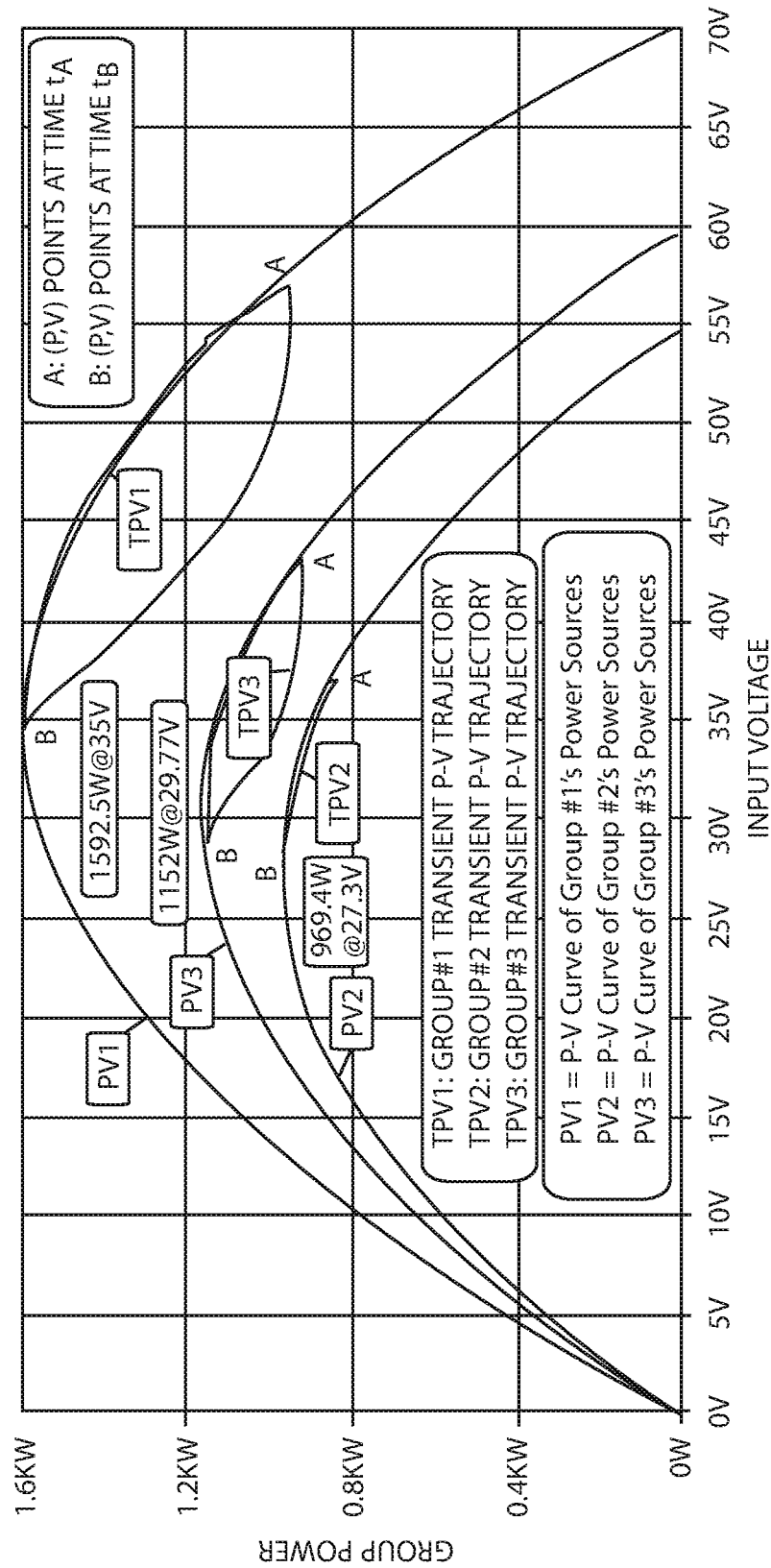
FIG. 18 is a graph illustrating a P-V trajectory of the same 3 groups of DISO converters (3 DISO converters per group) shown in FIG. 2, according to an embodiment of the present invention.

FIG. 18 is a graph 1800 illustrating a P-V trajectory of the same 3 groups of DISO converters (3 DISO converters per group) shown in FIG. 2, according to an embodiment of the present invention. In this embodiment, the P-V trajectory occurs during a transition between two operation modes or between GT-UVD input voltage regulation (point B in FIG. 18 corresponding to time $t_B$ shown in FIG. 17) and battery-charge current regulation (at 8 A battery current, point A in FIG. 18 corresponding to time to shown in FIG. 17).

In graph 1800, the simulated Power-Voltage (P-V) trajectories, which are obtained from the same set of simulation results shown in FIG. 17, is illustrated. Each P-V trajectory shows the total input power drawn from each group of three power sources (Y-axis) versus its respective source input voltage (X-axis, with identical input voltages per group due to UIVD control). TPV1, TPV2, and TPV3 are the assigned names of three transient P-V trajectories for group #1's, group #2's, and group #3's power sources, respectively. In FIG. 18, TPV1, TPV2, and TPV3 transient P-V trajectories are plotted and overlaid on their associated P-V DC characteristics PV1, PV2, and PV3, respectively, as previously shown in FIG. 16.

Simulation of System Fault-Tolerance

Figure 19:
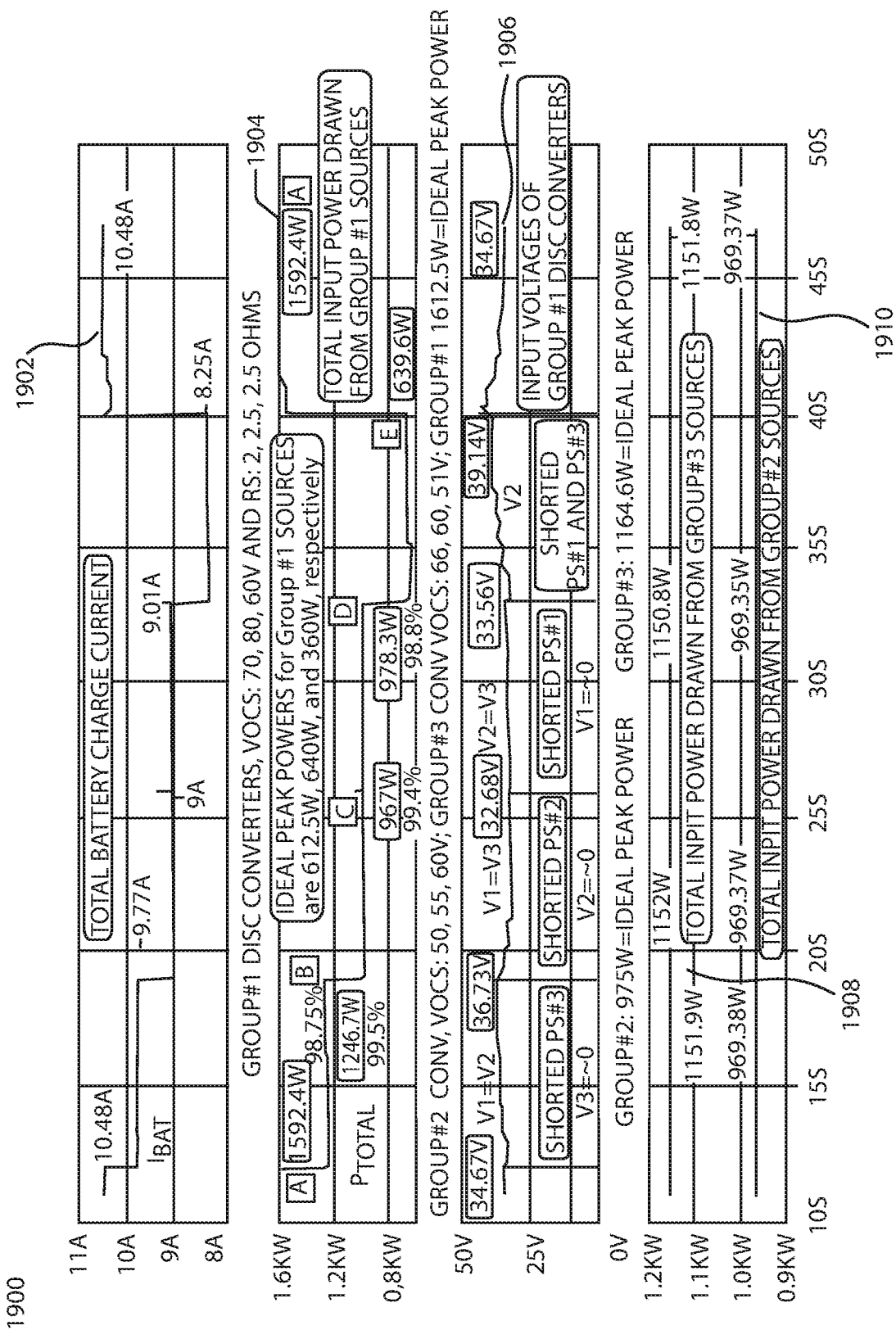
FIG. 19 is a graph illustrating a simulated response of distributed source voltages, system output voltage, and total sourcing power of the same power system shown in FIG. 2, according to an embodiment of the present invention.

FIG. 19 is a graph 1900 illustrating a simulated response of distributed source voltages, system output voltage, and total sourcing power of the same power system shown in FIG. 2, according to an embodiment of the present invention. The simulated response is performed with GT-UVD control before, during, and after (1) only one power source failure at a time from t=12 to 33 s, and (2) two power source failures in tandem (PS#1 and PS#3) from t=33 to 40 s. In graph 1900, 4 stacking plots of simulation results are shown. This graph 1900 shows the charge battery current on plot 1902, the group #1's total input power on plot 1904, the three distributed source voltages for group #1's power sources on plot 1906, and group #2's and group #3's total input power signals on plots 1910 and 1908, respectively.

As shown in FIG. 19, for time 12<t<19 s, group #1's power source PS#3 fails to deliver power ($V_3$=0), and the two remaining power sources are able to deliver their total sourcing power of 1246.7 W. The failure of power source PS#3 still results in 99.5% of tracking efficiency for power sources PS#1 and PS#2.

For time 19<t<26 s, group #1's power source PS#2 fails ($V_2$=0), and the two other power sources are able to deliver 967 W, as their total optimum power. This reveals 99.4% of tracking efficiency for power sources PS#1 and PS#3.

For time 26<t<33 s, group #1's power source PS#1 fails ($V_1$=0), and 978 W of the total optimum power is produced from power sources PS#2 and PS#3. This demonstrates 97.8% tracking efficiency.

For time 33<t<40 s, two of group #1's power sources PS #1 and #3 fail, with power source PS#2 delivering its optimum power of 639.6 W. This optimum power is almost the same as the 640 W ideal peak power that PS #2 can offer. As all three power sources of group #1 are restored to normal after time t=40 s, the power sources resume 1592.4 W of the total optimum power (98.75% tracking efficiency).

During these five simulated scenarios, the battery current (plot 1902 of FIG. 19) reveals five corresponding steady state values as 10.48 A (no failure), 9.77 A (failed PS#3), 9A (failed PS#2), 9.01 A (failed PS#1), and 8.25 A (failed PS #1 and PS #3). Regardless of how many power sources experience short-circuit across their sourcing terminals (that is, a single short-circuit fault or two short-circuit faults or no short-circuit fault), the single MPT control with UIVD still achieves over 98% of tracking efficiency while the other two groups of power sources without failure continuously deliver their total optimum power values of 969.4 W (99.4%) and 1152 W (98.9%) for group #2's and group #3's power sources, respectively (see plots 1910 and 1908 of FIG. 19).

Figure 20:
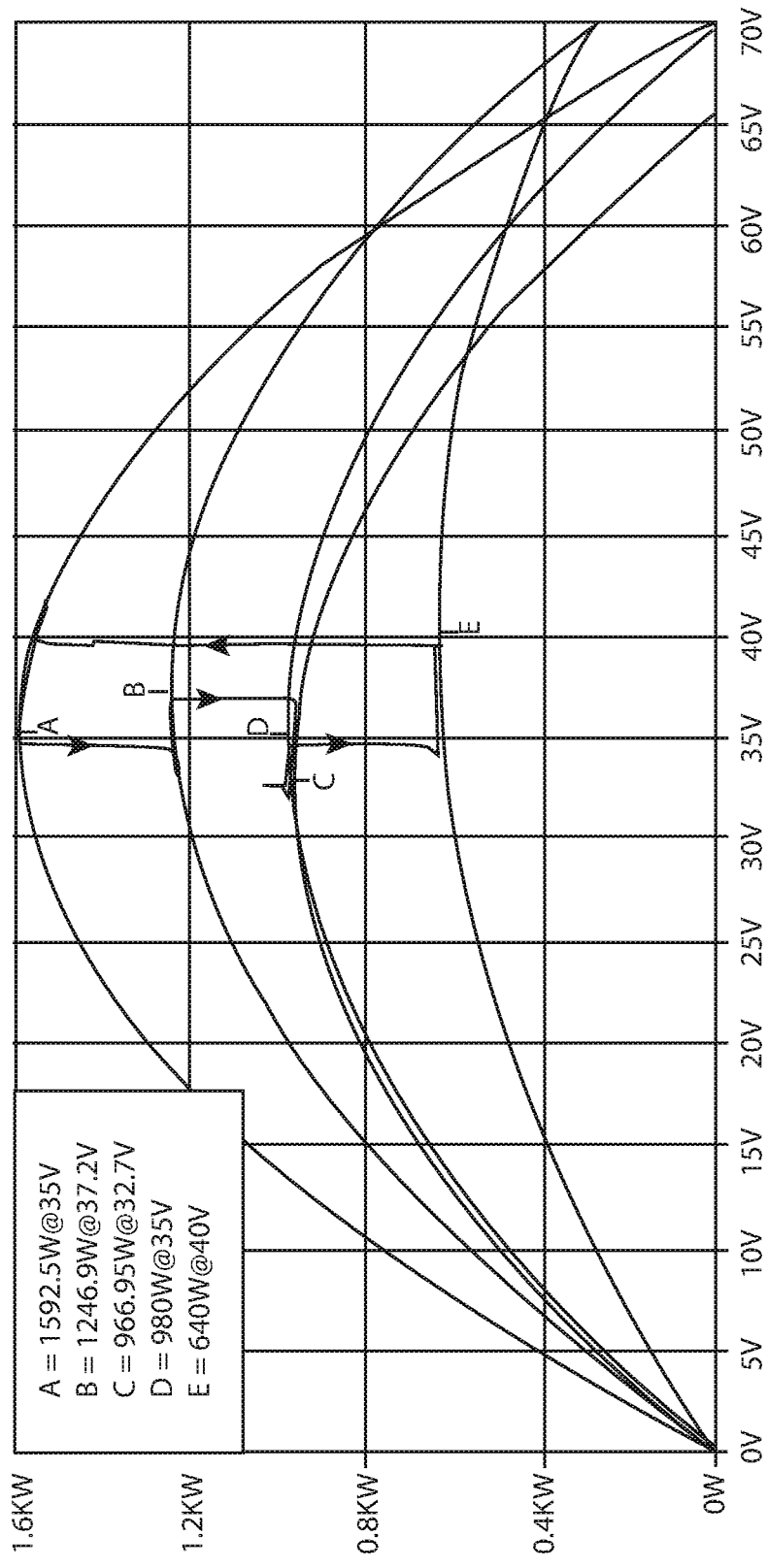
FIG. 20 is a graph illustrating a simulated P-V trajectory corresponding to group#1's total input power obtained from the same time-domain simulation result shown in FIG. 19, according to an embodiment of the present invention.

FIG. 20 is a graph 2000 illustrating a simulated P-V trajectory corresponding to group#1's total input power obtained from the same time-domain simulation result shown in FIG. 19, according to an embodiment of the present invention. In FIG. 20, graph 2000 reveals 5 stable peak-power points corresponding to points A, B, C, D, and E, respectively, belonging to five following scenarios: 1) 3 active power sources, 2) failed PS#3, 3) failed PS#2, 4) failed PS#1, and 5) failed PS#1 and PS#3. Specifically, P-V trajectory of group #1's power sources is overlaid on five static P-V characteristics for 5 scenarios as follows: 1) 3 active power sources, 2) failed PS#3, 3) failed PS#2, 4) failed PS#1, and 5) failed PS#1 and PS#3.

Under these different failures of group #1's power sources, the remaining group#2's and group#3's power sources are normal and operate continuously to deliver their peak power responses using their respective group-system controllers. Each of the group-system controllers provide independent UIVD control for equal source input voltages of each group of power sources. FIG. 20 clearly shows that all five stable points on the transient P-V trajectory (points A, B, C, D, and E) are well aligned with the 5 peak-power points located on the associated maximum points on the five static P-V characteristics, signifying that the UTD-MPT control works as anticipated. These five operating points A-E on the transient P-V trajectory deliver 98.75%, 99.5%, 99.4%, 97.8% and 99.9% of tracking efficiency with respect to the ideal peak power values obtained from the ideally uniform input voltages across the remaining active power sources (without fault).

Regulated-Bus Power System Simulation

FIGS. 21-24 display plots of simulation results that were obtained from the regulated bus power architecture shown in FIG. 5 under four values of the bus load current ($I_{BUS}$=2 A, 10 A, 11.97 A, and 4.63 A).

Figure 21:
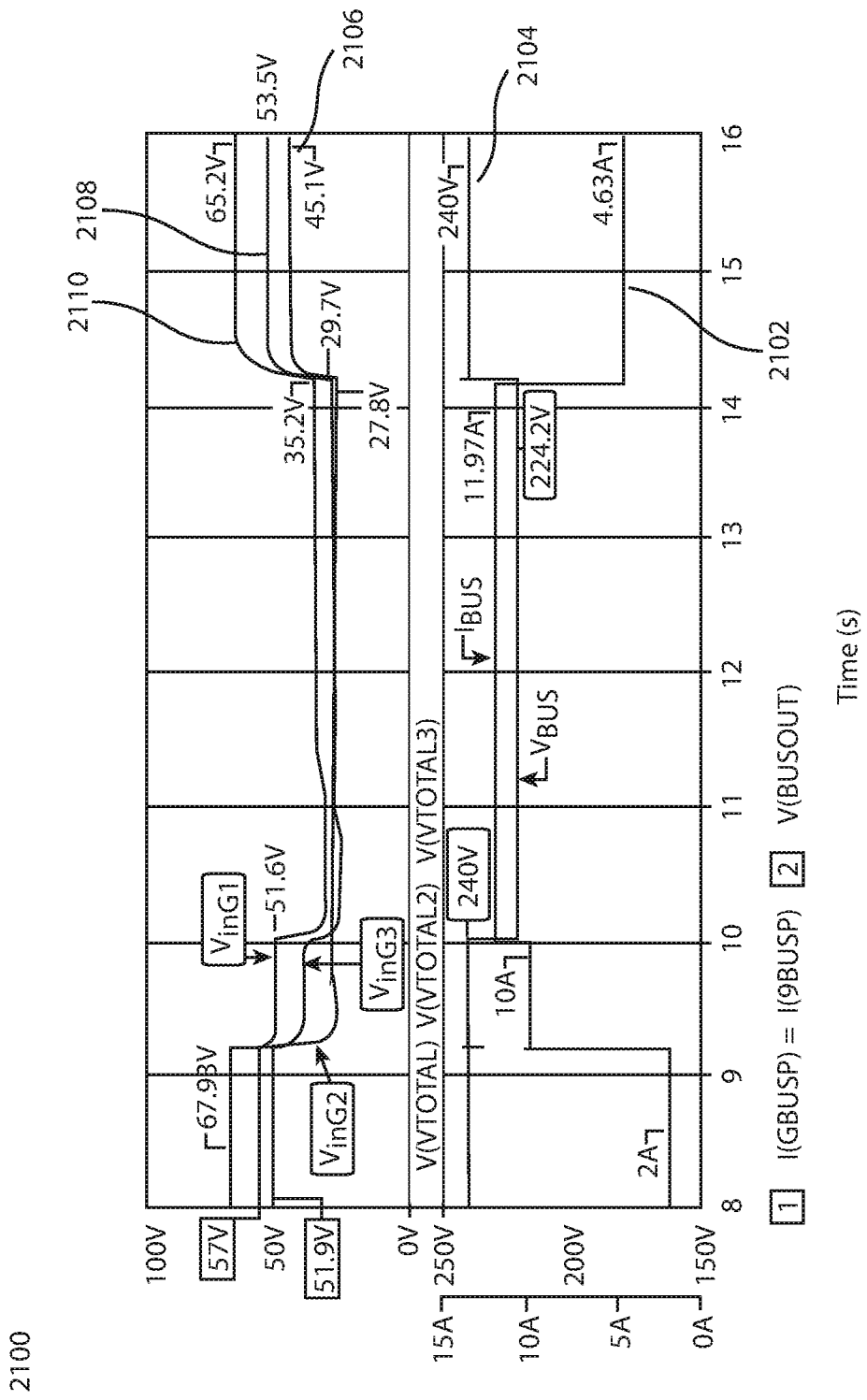
FIG. 21 is a graph illustrating simulated responses of the bus voltage, the bus current, distributed input voltages of three DISO converter groups, according to an embodiment of the present invention under the power configuration shown in FIG. 5.

FIG. 21 is a graph 2100 illustrating simulated responses (see plots 2102-2110) of the bus voltage, the bus current, distributed input voltages of three DISO converter groups, according to an embodiment of the present invention. As shown in FIG. 21, for t<10 s or t>14.2 s, bus voltage $V_{BUS}$ is regulated at 240 VDC when the total bus load demand is below the total available source power delivered by three groups of power sources (3 different power sources per group). Bus voltage $V_{BUS}$ may lose its 240-V bus voltage regulation when the bus load demand exceeds the total available power delivered by the 9 power sources (3 power sources per group, 3 groups of power sources) as disclosed by plot 2102 for 10 s<t<14.2 s.

Figure 22:
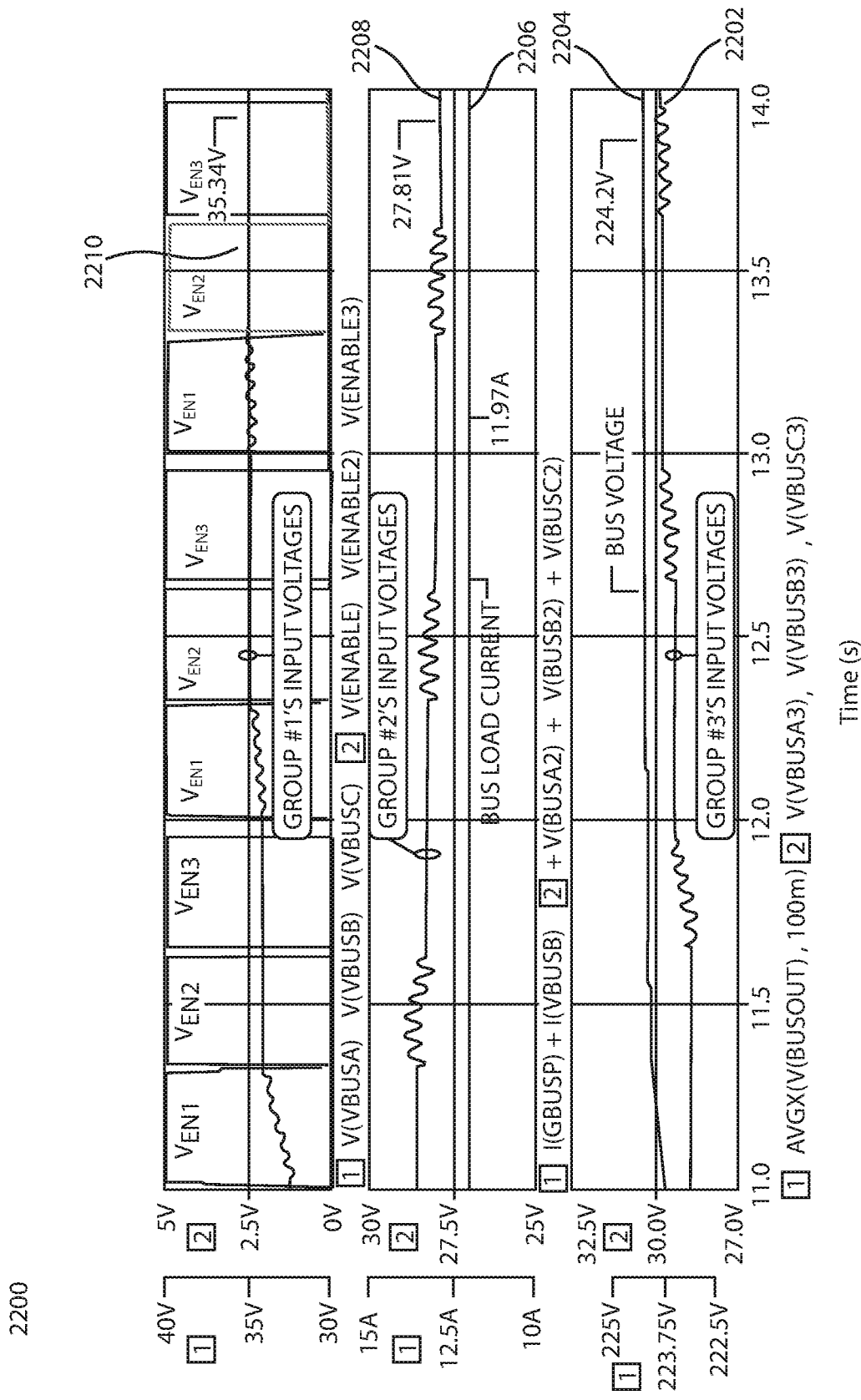
FIG. 22 is a graph illustrating simulated responses of bus voltage, bus current, 9 distributed input voltages (3 uniform voltages per group, for 3 groups of DISO converters), and three group enable signals during the MPT operation when the bus load demand exceeds the total available power of nine power sources, according to an embodiment of the present invention under the power configuration shown in FIG. 5.

FIG. 22 is a graph 2200 illustrating simulated responses of bus voltage, bus current, 9 distributed input voltages (3 uniform voltages per group, for 3 groups of DISO converters), and three group enable signals during the MPT operation when the bus load demand exceeds the total available power of nine power sources, according to an embodiment of the present invention.

In FIG. 22, graph 2200 reveals the detail of a UTD control feature. The UTD control feature may deliver group enable signals $V_{EN1}$, $V_{EN2}$, and $V_{EN3}$ (see the top plot of graph 2200). Group enable signals $V_{EN1}$, $V_{EN2}$, and $V_{EN3}$ are configured to enable the active group-MPT control on one group of power sources at a time.

Time-domain responses of group #1's, group #2's, and group #3's input voltages are respectively shown on plots 2210, 2208, and 2202. Note that the three input voltages per group are perfectly aligned and seen as only one single trace. This confirms the effectiveness of UIVD control, of which the detailed control diagrams were previously shown in FIGS. 4, 9, and 10.

Observe, whenever one group of power sources is actively controlled for their group-peak power voltage, the 20-Hz AC ripple voltage is present on their associated input voltages. The absence of the 20-Hz AC ripple voltage also occurs to hold the most recent group peak-power voltage whenever that power group is not actively controlled to update its new peak-power voltage. The simulation results shown in FIG. 22 are obtained from the same set of the simulation data shown in FIG. 21.

Figure 23:
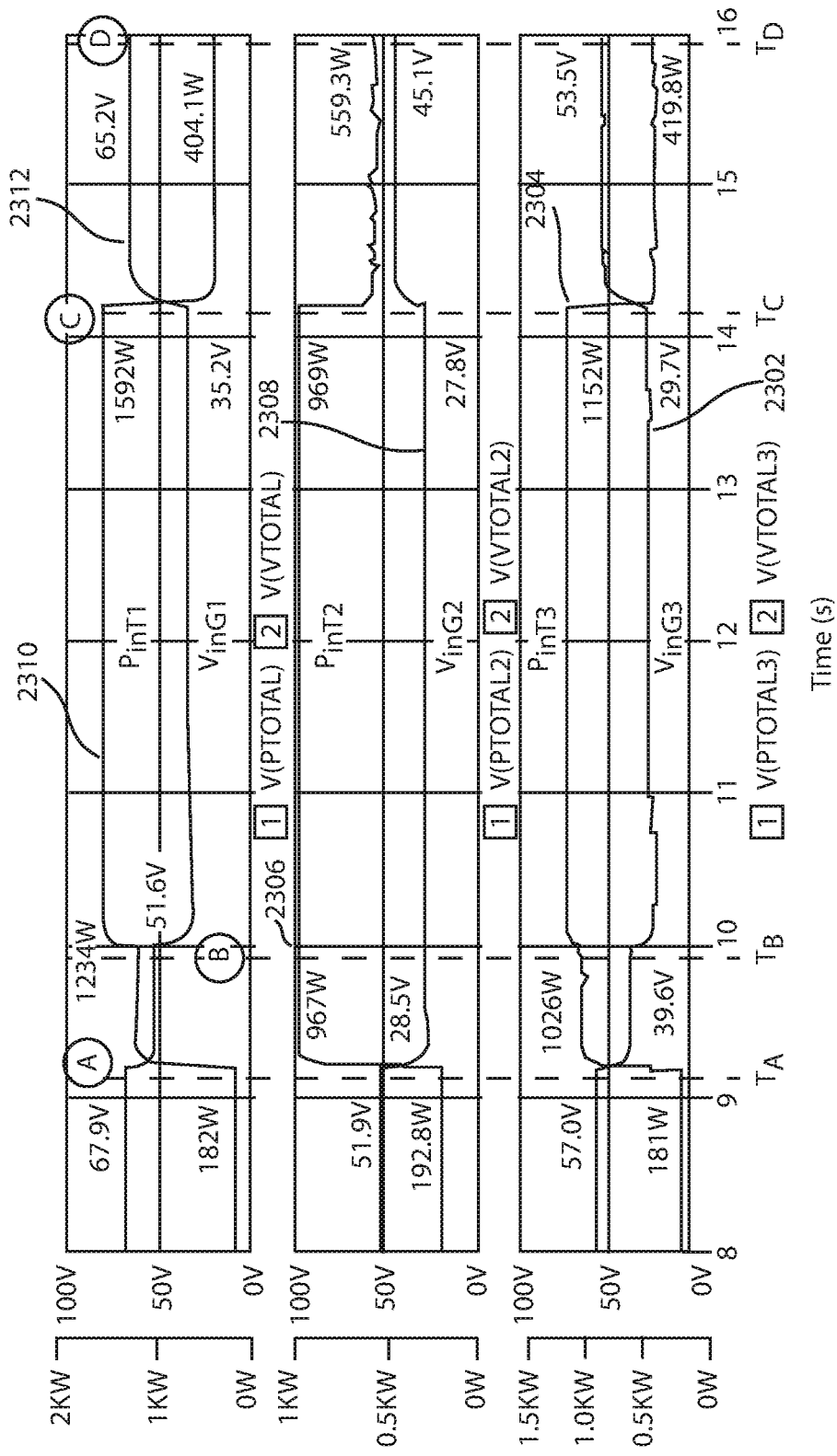
FIG. 23 is a graph illustrating simulated responses obtained from the same simulation result depicted in FIG. 21, showing three group total input powers ($P_{inT1}$, $P_{inT2}$, $P_{inT3}$) and three group input voltages ($V_{inG1}$, $V_{inG2}$, $V_{inG3}$) under four values of the bus load current ($I_{BUS}$=2 A, 10 A, 11.97 A, and 4.63 A) as previously shown in FIG. 21, according to an embodiment of the present invention.

FIG. 23 is a graph 2300 illustrating simulated responses 2302-2312 obtained from the same simulation result depicted in FIG. 21, showing three group total input powers ($P_{inT1}$, $P_{inT2}$, $P_{inT3}$) and three group input voltages ($V_{inG1}$, $V_{inG2}$, $V_{inG3}$) under four values of the bus load current ($I_{BUS}$=2 A, 10 A, 11.97 A, and 4.63 A) as previously shown in FIG. 21, according to an embodiment of the present invention.

Figure 24:
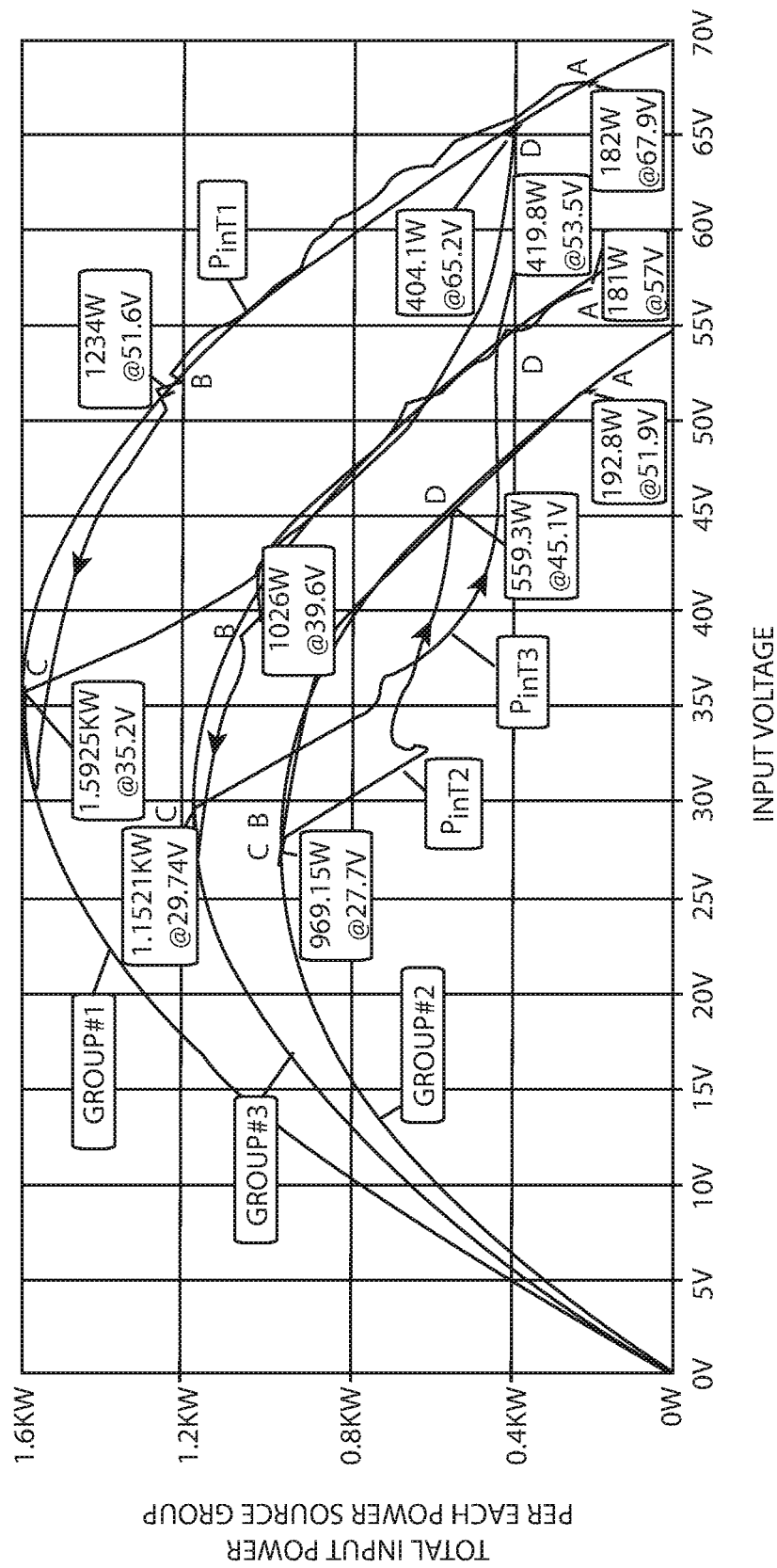
FIG. 24 is a graph illustrating Power-Voltage (P-V) trajectories corresponding to the three group total input powers ($P_{inT1}$, $P_{inT2}$, $P_{inT3}$) and three respective group input voltages ($V_{inG1}$, $V_{inG2}$, $V_{inG3}$), according to an embodiment of the present invention.

FIG. 24 is a graph 2400 illustrating P-V (P-V) trajectories corresponding to the three group total input powers ($P_{inT1}$, $P_{inT2}$, $P_{inT3}$) and three respective group input voltages ($V_{inG1}$, $V_{inG2}$, $V_{inG3}$), according to an embodiment of the present invention. The three group total input powers ($P_{inT1}$, $P_{inT2}$, $P_{inT3}$) and three respective group input voltages ($V_{inG1}$, $V_{inG2}$, $V_{inG3}$) are obtained from the same time-domain simulation result shown in FIGS. 21 and 23.

Both FIGS. 23 and 24 show that $V_{inGi}$ is the average of group #i's input voltages or $V_{inGi}=(⅓)*(V_1+V_2+V_3)_{\#i}$ of group #i's power sources, where i=1, 2, and 3. Printed as proper labels on the plotted results shown in FIGS. 23 and 24 are $P_{inT1}$, $P_{inT2}$, and $P_{inT3}$, which are group #1's, group #2's, and group #3's total input powers drawn from their associated power sources. At time labels, $t_A$, $t_B$, $t_C$, and $t_D$, shown in FIG. 23, there exist the corresponding steady-state operating points A, B, C, and D. See FIG. 24. Only the operating points marked with C are under the active group-MPT control for all of the three groups of DISO converters, which utilizes the unified UTD, UIVD, and MPT control features without any control conflict. For operating points with B, only group#2 of DISO converters are actively controlled to track their peak power voltages while the other two groups of DISO converters are controlled to regulate the bus voltage at 240V. For operating points with A and D labels, none of DISO converters operates in the MPT mode but all of the three groups of DISO converters are controlled to regulate the bus voltage at 240V.

In an embodiment, an apparatus includes a plurality of distributed-input series-output (DISO) converters actively controlled by a common maximum power tracking (MPT) controller and a uniform time distribution (UTD) controller. The common MPT controller is configured to actively enable one DISO converter from the plurality of DISO converters to update a new peak power voltage of the one DISO converter while the remaining DISO converters are controlled to hold most recent peak power voltages. The most recent peak power voltages is updated during a previous uniform time window of an active MPT control. The UTD controller is configured to enable an input voltage of the one DISO converter to be actively controlled to reach or approach a new peak power voltage of an associated power source connected to the one DISO converter while the remaining DISO converters are disabled from being actively controlled for their respective new peak power voltages and are further controlled to hold their most recently peak power voltages, the most recent peak power voltages being previously updated during the previous uniform time window of their active MPT control using the common MPT controller.

In some embodiments, the apparatus includes a system load that terminates across a system output voltage. This system output voltage becomes a battery dominated voltage bus or a regulated voltage bus. The battery dominated voltage bus may be terminated by a battery, and the regulated voltage bus may be terminated by a bulk filtering capacitance connected in parallel with the system load.

In certain embodiments, each DISO converter includes a shared-bus control input $SB_i$ allowing an external signal to take control of a converter power stage. In some further embodiments, each DISO converter has a predefined number of parallel-connected converter modules. The parallel-connected converter modules are configured with shared-bus control inputs tied together to form a common shared-bus control port to achieve uniform current-sharing.

Also, in certain embodiments, each DISO converter operates in a standalone configuration with an output that is regulated at a pre-determined voltage and its shared-bus input is left unconnected. In yet some further embodiments, each DISO converters provides electrical isolation between an input and output.

In some embodiments, the common MPT controller is configured to process a bus current signal and a voltage dither signal to deliver an output voltage signal. The voltage dither signal may include AC ripple voltage configured to serve as a front-end input of the common MPT controller and a back-end AC voltage to be superimposed on a DC output voltage of the common MPT controller. The output voltage signal includes an updated DC output voltage signal and the voltage dither signal.

In some embodiments, each DISO converter includes a bus stabilizer network terminated across a output voltage signal to damp out AC energy.

In some embodiments, the apparatus includes a top-level system controller. This top-level system controller includes a battery charge regulation controller for a battery dominated bus or a bus voltage regulation controller for a regulated voltage bus. The top-level system controller also includes a time-divisional MPT-enable signal generator, the common MPT controller, and a plurality of input signals feeding into the battery charge regulation controller or the bus voltage regulation and the common MPT controller.

In some additional embodiments, the apparatus includes a group-level system controller for each DISO converter. The group-level system controller is configured to provide system distributed input-voltage regulation, and a distributed maximum power voltage $V_{SPTi}$, where subscript i represents the $i^{th}$-DISO converter.

In some further embodiments, each DISO converter includes a bus stabilizer network terminated across a group output to damp out AC energy to ensure group-level system stability.

In another embodiment, an apparatus includes groups of distributed-input series-output (DISO) converters actively controlled by a common MPT controller, a UTD controller, and a group UVD controller. The MPT controller actively controls the DISO converters in one enabled group of DISO converters to update a present group-peak power voltage of the DISO converters within the enabled group, while remaining groups are controlled to hold most recent grouped peak power voltages updated during a previous uniform time window of an active MPT control. The UTD controller enables input voltages of the one enabled group to be actively controlled to reach or approach a new group peak power voltage of associated power sources connected to the DISO converters within the enabled group, while the remaining groups are disabled from being actively controlled for their respective new group peak power voltages, and are controlled to hold most recent group peak power voltages. The most recent group peak power voltages are previously updated during their previous non-overlapping uniform time windows of the active MPT control using the common MPT controller. Each UVD controller is dedicated per one group of DISO converters and is configured to actively equalize distributed input voltages of the DISO converters belonging to the associated converter group. It should be noted that equal input voltages for one group of DISO converters have a different voltage from that of the equal input voltages for another group of DISO converters, and the number of the group UVD controllers are equal to the number of groups of DISO converters.

In some embodiments, the apparatus includes a system load terminated across the system bus voltage. The system bus voltage is a battery dominated voltage bus or a regulated voltage bus, for example. The battery dominated voltage bus may include a battery charge regulation controller and the regulated voltage bus may include a bus voltage regulation controller.

In some further embodiments, the apparatus includes a bus stabilizer capacitor terminated across a system output voltage to damp out AC energy to ensure system stability. The apparatus may also include a voltage of a system regulated-voltage bus or a battery charge current under a battery-dominated voltage bus that is closed-loop controlled by at least one non-MPT group of DISO DC-DC converters with its $i^{th}$-group-level output port being series-connected to other $j^{th}$-group-level output ports, where i not equal to j.

In some embodiments, the group-level system controller provides a multiple-fault-tolerant coverage. The apparatus in some embodiments includes an input voltage regulator controller per group of DISO converters. The input voltage regulator controller includes a strongest distribution voltage signal as a feedback input for one associated group of DISO converters.

In certain embodiments, the strongest distribution voltage signal is a maximum-limit voltage detected from distributed input voltages of the power sources, each of which is connected to an input of an associated DISO converter within a same group of DISO converter.

In some embodiments, the apparatus includes an input voltage regulator per group of DISO converters that actively controls the distribution voltage signal which follows the commanding set-point voltage for an associated group of DISO converters. Within each converter group, an input voltage of a DISO converter provides the highest voltage among all the distributed-input voltages of the remaining DISO converters while these distributed input voltages are controlled to have a uniform voltage distribution at all time that are nearly equal to the highest input voltage. Further, the maximum-limit input voltage regulation allows the converter power system to tolerate more than one failure due to short-circuit or open-circuit of power sources and/or short-circuit or overload across distributed inputs of DISO converters.

In yet some other embodiments, an apparatus includes a group of DISO converters that are actively controlled by a common MPT controller. The common MPT controller actively controls one of the DISO converters in the group of DISO converters to update a present group-peak power voltage of the one DISO converters while remaining DISO converters in the group of DISO converters are controlled to hold most recently grouped peak power voltages updated during a previously uniform time window of an active MPT control.

The group of the DISO converters are interconnected and each group the DISO converters includes a plurality of DISO converters with outputs being series-connected across a battery bank having an output voltage $V_{BUS}$.

The apparatus in some embodiments includes a system load terminated across the output voltage $V_{BUS}$ to cause the output voltage $V_{BUS}$ to become a battery voltage bus or an unregulated-voltage bus. The battery voltage bus may operate without a battery charge regulation controller, and the unregulated voltage bus may operate without a bus voltage regulation controller.

Each DISO converters may also include a shared-bus control input SBi, to allow an external signal to take control of a converter power stage.

Further, each DISO converter may represent a number of parallel-connected converter modules configured with shared-bus control inputs tied together to form a common shared-bus control port to achieve uniform current-sharing.

Each group of the DISO converters may operate in a standalone configuration, such that an output is regulated at a pre-determined voltage and shared-bus input of each of the plurality of DISO converters is left unconnected. Each DISO converters may also provide electrical isolation between an input and an output.

Each group of the DISO converters may also include a plurality of independently sources DISO converters with group outputs $V_{OUT1} \ldots V_{OUTN}$ being series connected across a system output voltage $V_{BUS}$.

In some embodiments, the common MPT controller configured to output a PLL and a dither voltage signal $V_{DITHER}$, both of which are used by each distributed gated integrated per the group of DISO converters. The dither voltage signal $V_{DITHER}$ may provide a noise-free reference sinusoidal voltage representing AC ripple superimposed on sourcing voltages. The common MPT controller may use the dither voltage signal $V_{DITHER}$ to detect a right control direction toward a group peak-power voltage, thereby eliminating a conventional use of an analog multiplier for computation of actual power delivered to the bus.

Within each group of the DISO converters, each converter may operate in a MPT mode or non-MPT mode for regulating uniform voltage regulation across inputs of each of the DISO converters at a voltage corresponding to a most recent group peak-power voltage candidate sign $V_{SPTi}$. When in the MPT mode, a fixed amount of AC dither signal $V_{DITHER}$ is superimposed on most recent group peak-power voltage candidate sign $V_{SPTi}$ is active high for enabling of the MPT mode as conceptually realized by a time-division MPT-enable signal generator while remaining voltage enable signal $V_{Enj}$, where j is not equal to i, are inactive for disabling of the MPT mode.

It will be readily understood that the components of various embodiments of the present invention, as generally described and illustrated in the figures herein, may be arranged and designed in a wide variety of different configurations. Thus, the detailed description of the embodiments, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. An apparatus, comprising:
    groups of distributed-input series-output (DISO) converters actively controlled by a common maximum power tracking (MPT) controller, a uniform time distribution (UTD) controller, and a group uniform voltage distribution (UVD) controller, wherein
    the MPT controller is configured to actively control a plurality of DISO converters in one enabled group of DISO converters to update a present group-peak power voltage of the DISO converters within the enabled group, while remaining groups of DISO converters are controlled to hold most recent grouped peak power voltages updated during a previous uniform time window of an active MPT control, and
    the UTD controller is configured to enable input voltages of the one enabled group to be actively controlled to track a new group peak power voltage of associated power sources connected to the DISO converters within the enabled group, while the remaining groups are disabled from being actively controlled for their respective new group peak power voltages, and are controlled to hold most recent group peak power voltages, the most recent group peak power voltages are previously updated during previous uniform time windows of the active MPT control using the common MPT controller,
    each UVD controller is dedicated per one group of DISO converters and is configured to actively equalize distributed input voltages of the DISO converters belonging to the associated converter group,
    equal input voltages for one group of DISO converters have a different voltage from that of the equal input voltages for another group of DISO converters, and
    the number of the group UVD controllers are equal to the number of groups of DISO converters.

2. The apparatus of claim 1, further comprising:
    a system load terminated across a system bus voltage, wherein
    the system bus voltage is a battery dominated voltage bus or a regulated voltage bus,
    the battery dominated voltage bus comprises a battery charge regulation controller, and
    the regulated voltage bus comprises a bus voltage regulation controller.

3. The apparatus of claim 1, further comprising:
    a bus stabilizer capacitor terminated across a system output voltage to damp out AC energy to ensure system stability.

4. The apparatus of claim 1, further comprising:
a voltage of a system regulated-voltage bus or a battery charge current under a battery-dominated voltage bus is closed-loop controlled by at least one non-MPT group of DISO DC-DC converters with its $i^{th}$-group-level output port being series-connected to other $j^{th}$-group-level output ports,
where i not equal to j.

5. The apparatus of claim 1, wherein the group-level system controller provides a multiple-fault-tolerant coverage.

6. The apparatus of claim 1, further comprising:
an input voltage regulator controller per group of DISO converters comprises a strongest distribution voltage signal as a feedback input for one associated group of DISO converters.

7. The apparatus of claim 6, wherein the strongest distribution voltage signal is a maximum-limit voltage detected from distributed input voltages of the power sources, each of which is connected to an input of an associated DISO converter within a same group of DISO converter.

8. The apparatus of claim 1, further comprising:
an input voltage regulator per group of DISO converters configured to actively control on the distribution voltage signal to follow the commanding set-point voltage for an associated group of DISO converters.

9. The apparatus of claim 8, wherein within each converter group, an input voltage of a DISO converter provides the highest voltage among all the distributed-input voltages of the remaining DISO converters while these distributed input voltages are controlled to have a uniform voltage distribution at all time that are nearly equal to the highest input voltage.

10. The apparatus of claim 9, wherein the maximum-limit input voltage regulation allows the converter power system to tolerate more than one failure due to short-circuit or open-circuit of power sources and/or short-circuit or overload across distributed inputs of DISO converters.

* * * * *